US010627258B2

(12) United States Patent
Morita et al.

(10) Patent No.: US 10,627,258 B2
(45) Date of Patent: Apr. 21, 2020

(54) RESOLVER

(71) Applicant: Mitsubishi Electric Corporation, Tokyo (JP)

(72) Inventors: Yusuke Morita, Tokyo (JP); Atsushi Yamamoto, Tokyo (JP); Masahiko Fujita, Tokyo (JP); Naohiro Motoishi, Tokyo (JP); Kazumasa Ito, Tokyo (JP); Masatsugu Nakano, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 392 days.

(21) Appl. No.: 15/324,793

(22) PCT Filed: Aug. 21, 2014

(86) PCT No.: PCT/JP2014/004301
§ 371 (c)(1),
(2) Date: Jan. 9, 2017

(87) PCT Pub. No.: WO2016/027290
PCT Pub. Date: Feb. 25, 2016

(65) Prior Publication Data
US 2017/0199057 A1    Jul. 13, 2017

(51) Int. Cl.
*G01D 5/20* (2006.01)
*H02K 24/00* (2006.01)

(52) U.S. Cl.
CPC ........... *G01D 5/2066* (2013.01); *H02K 24/00* (2013.01)

(58) Field of Classification Search
CPC ............................. G01D 5/2066; H02K 24/00
(Continued)

(56) References Cited

U.S. PATENT DOCUMENTS

| 2006/0012262 A1* | 1/2006 | Baba ...................... H02K 1/185 310/216.067 |
| 2009/0066183 A1* | 3/2009 | Aramaki ................ H02K 1/148 310/216.008 |
| 2013/0088127 A1* | 4/2013 | Ogawa ................. H02K 15/085 310/68 B |

FOREIGN PATENT DOCUMENTS

| CN | 2328821 Y * | 7/1999 | ............. F04D 25/06 |
| CN | 202602403 U | 12/2012 | |

(Continued)

OTHER PUBLICATIONS

Fujita et al.; Translation of JP 2013-121225; Jun. 17, 2013; Google and EPO (Year: 2013).*

(Continued)

*Primary Examiner* — Melissa J Koval
*Assistant Examiner* — Rahul Maini
(74) *Attorney, Agent, or Firm* — Sughrue Mion, PLLC; Richard C. Turner

(57) ABSTRACT

In a related-art resolver, a front and a back of a stator core cannot be distinguished, and it is difficult to mass-produce the resolver while matching directions of shear drops and burrs. Thus, assembly accuracy of the resolver is degraded. Further, productivity and assembling ability are degraded because electromagnetic steel sheets are laminated by rotary lamination. The present invention provides a resolver including: a resolver stator including: a stator core formed of electromagnetic steel sheets, which have teeth, and are laminated without rotary lamination; a one-phase excitation winding; and two-phase output windings; and a resolver rotor arranged to be opposed to the resolver stator, in which the stator core has marks which enable distinction of a rolling direction of the stator core and distinction of a front and a back of the stator core.

12 Claims, 22 Drawing Sheets

(58) Field of Classification Search
USPC .................................................. 324/207.17
See application file for complete search history.

(56) References Cited

FOREIGN PATENT DOCUMENTS

| | | |
|---|---|---|
| EP | 1471624 A2 | 10/2004 |
| JP | 2005-127768 A | 5/2005 |
| JP | 2013-027122 A | 2/2013 |
| JP | 2013-121225 A | 6/2013 |
| JP | 2013-176265 A | 9/2013 |

OTHER PUBLICATIONS

Kuwabara; Translation of JP 2005-127768; May 19, 2005; Google and EPO (Year: 2005).*
Qingsheng; Translation of "Positioning Device for Small Heat Radiation Fan Stator and Inductive Element", Jul. 14, 1999; Google & EPO (Year: 1999).*
International Search Report for application No. PCT/JP2014/004301 dated Nov. 11, 2014.
Communication dated Jul. 4, 2018, from Japanese Patent Office in counterpart application No. 201480081386.1.
Communication dated Mar. 8, 2018 from the European Patent Office in counterpart EP application No. 14900122.4.

* cited by examiner

RESOLVER

This is a National Stage of International Application No. PCT/JP2014/004301, filed on Aug. 21, 2014, the contents of all of which are incorporated herein by reference in its entirety.

TECHNICAL FIELD

The present invention relates to a resolver configured to detect rotation of a rotary electric machine, and more particularly, to the structure of a resolver stator.

BACKGROUND ART

As the structure of a related-art resolver, there has been known a resolver including a resolver stator with magnetic pole teeth arranged at equal intervals along a circumferential direction of an annular base portion of the stator, and a resolver rotor configured to change a reluctance component in a gap defined between the stator and the rotor by changing an angular position relative to the stator (for example, see Patent Literatures 1 and 2).

In a resolver described in Patent Literature 1, a stator core is formed so that a rolling direction of a material for the stator core and a direction of a major axis of secondary-mode deformation substantially match to each other. Accordingly, there can be reduced an influence on angle detection errors of the resolver by a leakage flux from a rotator of a rotary electric machine being a detection target. Thus, angle detection accuracy can be increased. Further, there is no need to form the stator core by rotary lamination. As a result, productivity and assembling ability are improved.

Further, in a resolver disclosed in Patent Literature 2, angles excluding multiples of 360 degrees/(P/N) are set as rotary lamination angles of laminations (electromagnetic steel sheets). Thus, concentration of pitch errors only on certain phases is prevented, and the pitch errors are distributed to the entire laminations. In this manner, a VR-type resolver with high accuracy can be achieved.

CITATION LIST

Patent Literature

[PTL 1] JP 2013-121225 A (FIG. 12)
[PTL 2] JP 2005-127768 A (FIG. 5)

SUMMARY OF INVENTION

Technical Problems

However, in the resolver described in Patent Literature 1, the stator core has a circular outer periphery, and notches are formed in the outer periphery at symmetrical positions. Accordingly, a front and a back of the stator core cannot be distinguished, and it is difficult to mass-produce the resolver while matching directions of shear drops and burrs in each product during mass-production of the resolver. Thus, there is a problem in that assembly accuracy of the resolver is degraded, thereby degrading angle detection accuracy.

Further, in the resolver disclosed in Patent Literature 2, there is described that not only notches but also bolt insertion holes are formed in a core back of a resolver stator so that a front and a back of the resolver stator can be distinguished based on a positional relationship between the notches and the bolt insertion holes. However, there is a problem in that productivity and assembling ability are degraded because the stator core is formed by rotary lamination.

The present invention has been made in order to solve the above-mentioned problems. It is an object of the present invention to provide a resolver that can be improved in productivity and assembling ability through formation of the stator core without rotary lamination of electromagnetic steel sheets, and that can be improved in angle detection accuracy through production of the stator core with matched directions of shear drops and burrs.

Solution to Problem

According to one embodiment of the present invention, there is provided a resolver, including: a resolver stator including: a stator core formed of electromagnetic steel sheets, which have teeth and are laminated without rotary lamination; a one-phase excitation winding; and two-phase output windings; and a resolver rotor arranged to be opposed to the resolver stator, in which the stator core has marks which enable distinction of a rolling direction of the stator core and distinction of a front and a back of the stator core.

Advantageous Effects of Invention

According to the present invention, the front and the back of the stator core can be distinguished. Accordingly, assembly accuracy of the resolver can be improved by matching directions of shear drops and burrs, thereby being capable of reducing angle detection errors. Further, the stator core is formed of the electromagnetic steel sheets laminated without rotary lamination. Thus, productivity and assembling ability are improved. In addition, a rotational position of the stator core can be ascertained, thereby being capable of ascertaining positions of the windings and relative positions of the windings to the rolling direction of the stator core. Accordingly, the positions of the windings and the relative positions to the rolling direction of the stator core can be uniformized in all of the respective resolvers. Consequently, fluctuations in angle detection errors resulting from differences in the positions of the windings and the relative positions to the rolling direction of the stator core can be reduced.

DESCRIPTION OF EMBODIMENTS

First Embodiment

Figure 1:
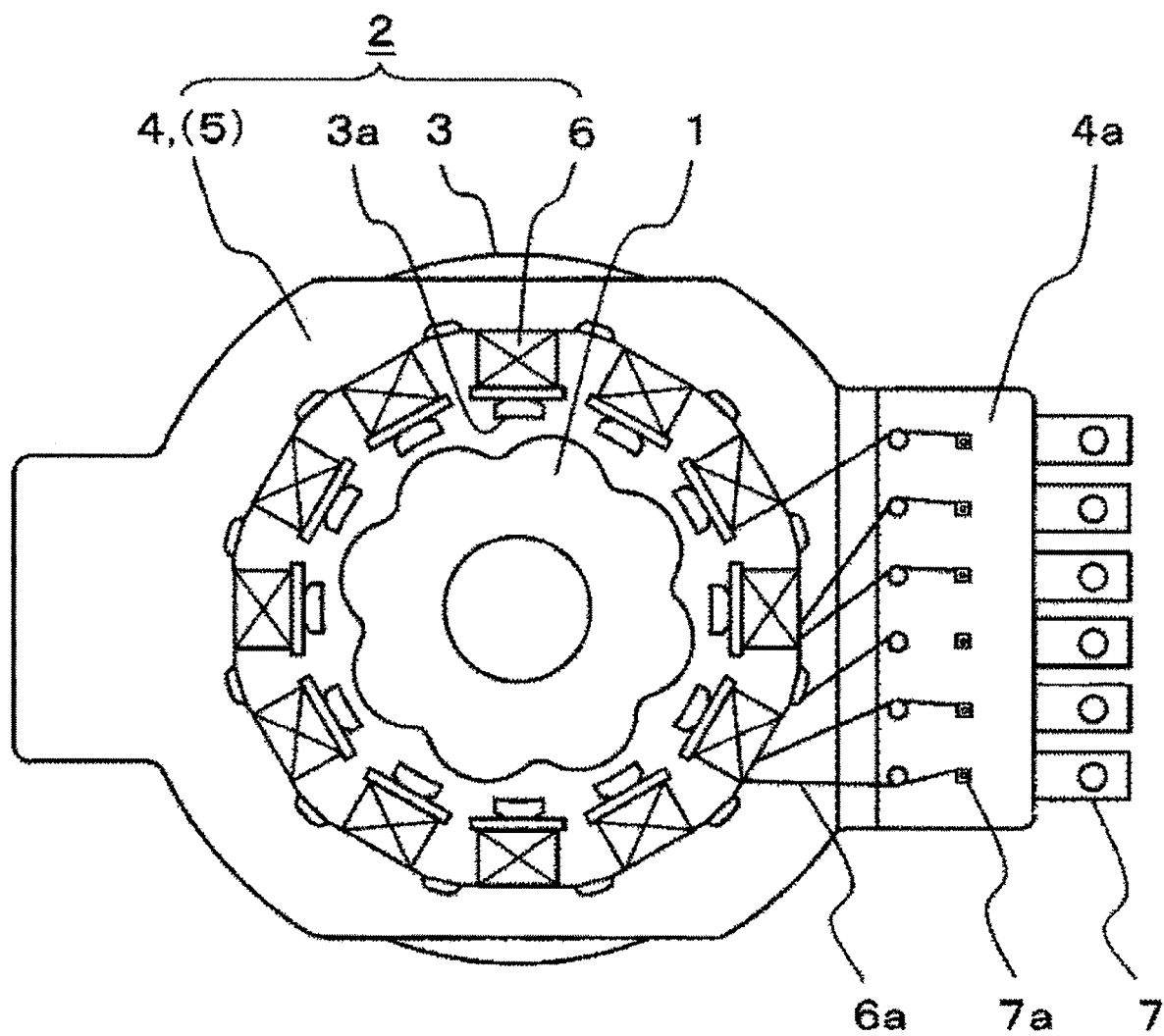
FIG. 1 is a front view of a resolver according to a first embodiment of the present invention.

Now, with reference to the drawings, a first embodiment of the present invention is described. In the drawings, the same or corresponding components and parts are denoted by the same reference symbols.

Figure 2:
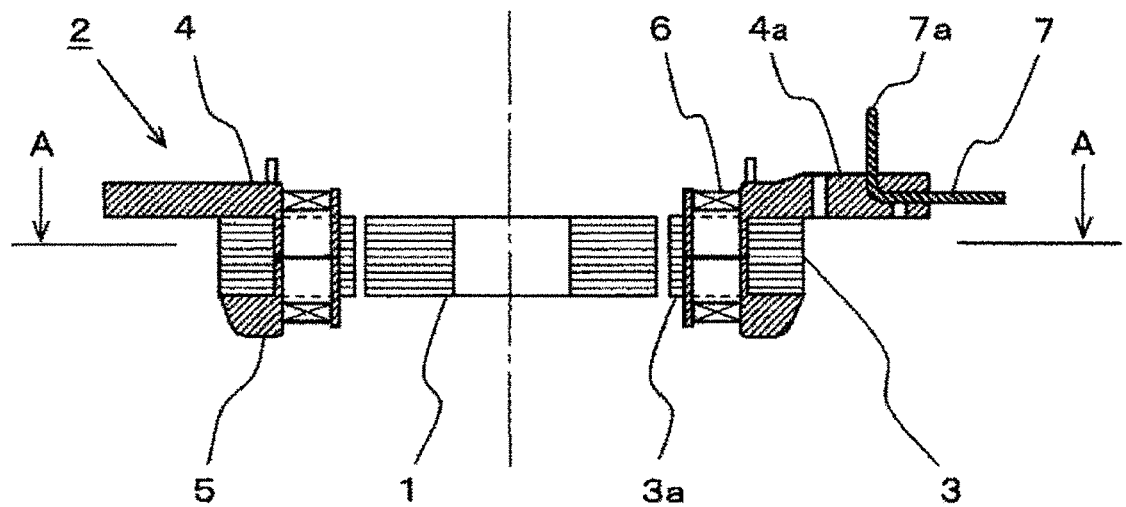
FIG. 2 is a sectional view of the resolver according to the first embodiment of the present invention.
Figure 3:
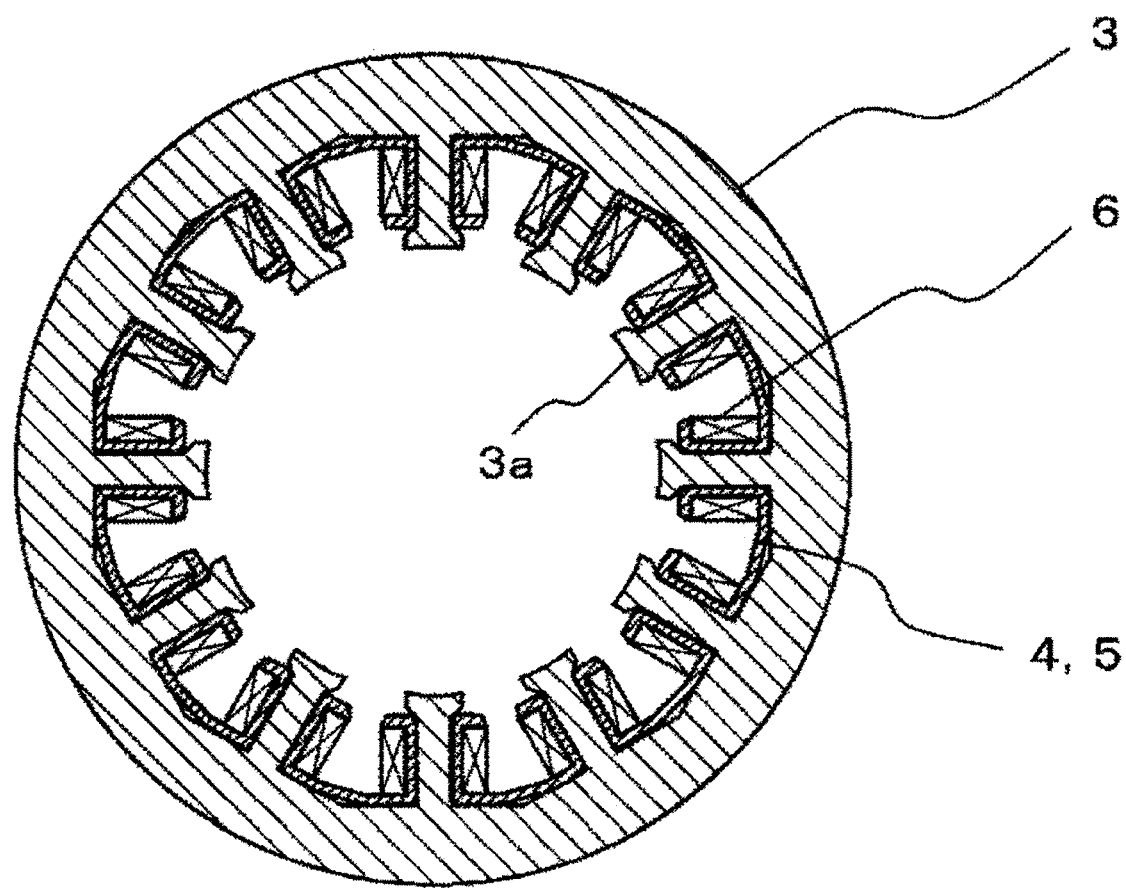
FIG. 3 is a sectional view taken along the line A-A of FIG. 2.
Figure 4:
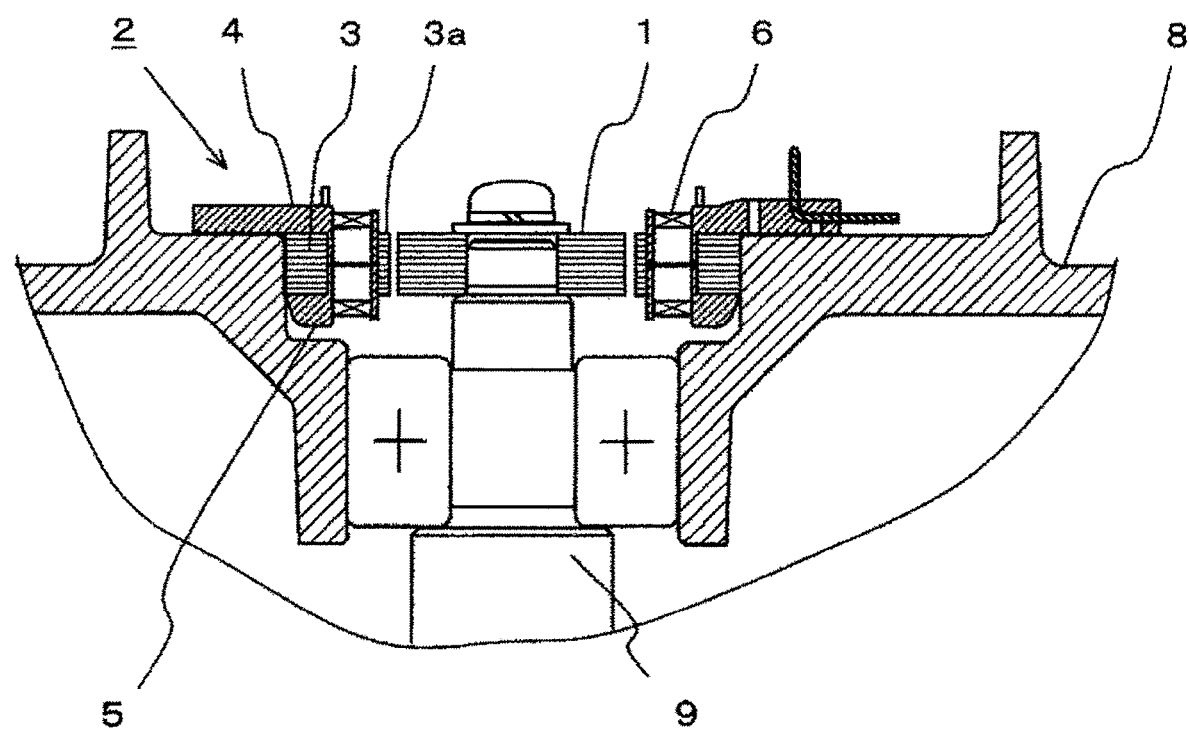
FIG. 4 is a sectional view for illustrating a state in which the resolver according to the first embodiment of the present invention is mounted to a bracket of a rotary electric machine.
Figure 5:
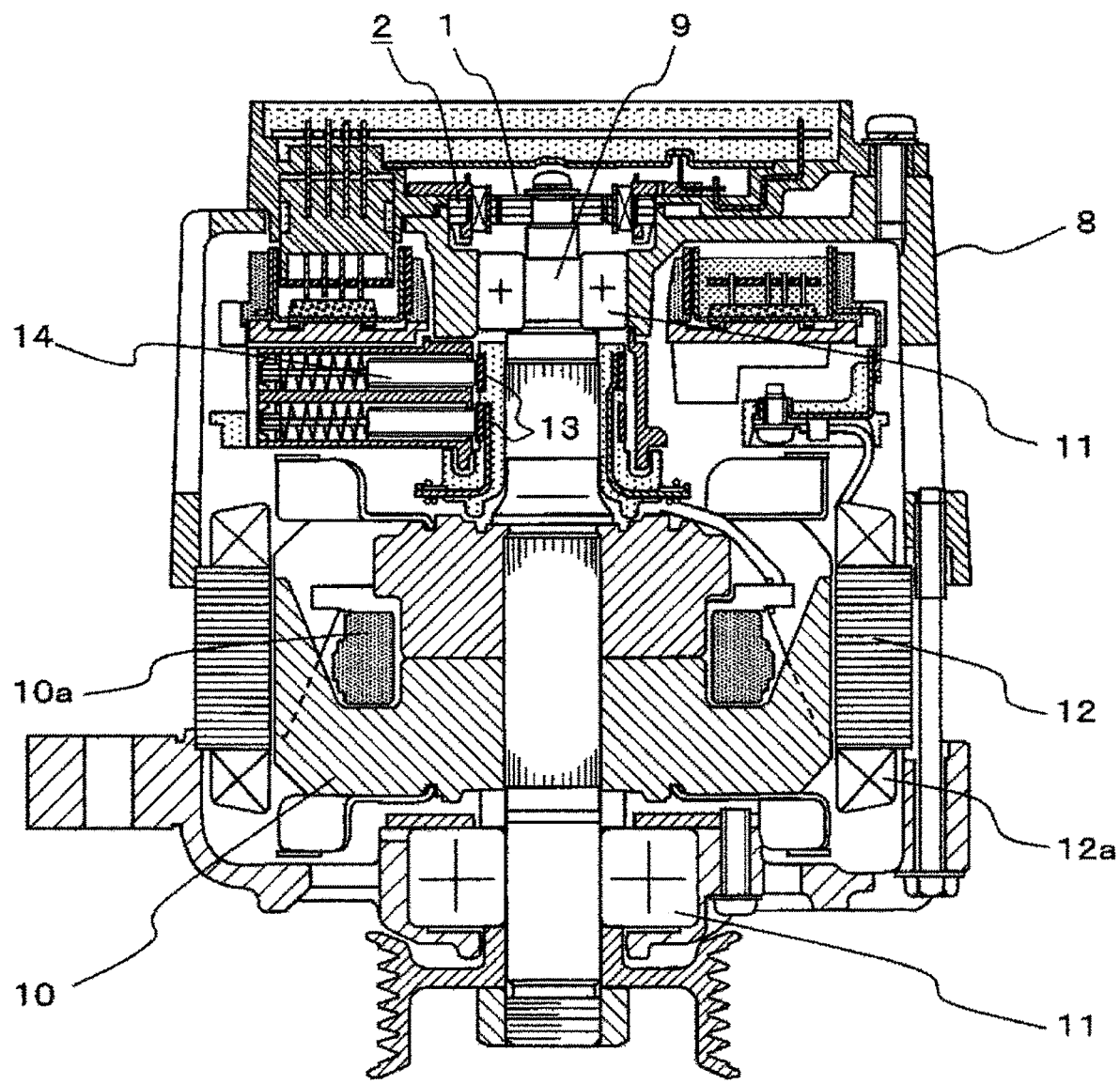
FIG. 5 is a sectional view for illustrating a state in which the resolver according to the first embodiment of the present invention is incorporated into the rotary electric machine.
Figure 6:
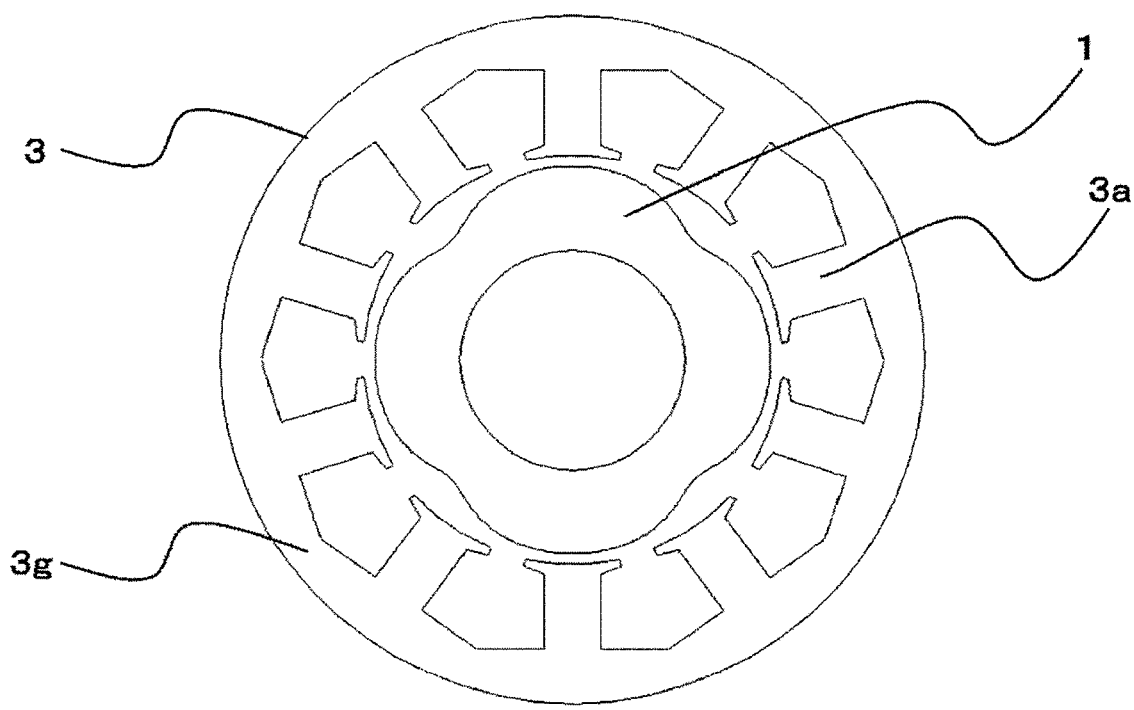
FIG. 6 is a plan view for illustrating a positional relationship between a stator core and a resolver rotor according to the first embodiment of the present invention.

FIG. 1 is a front view of a resolver according to a first embodiment of the present invention. FIG. 2 is a sectional view of the resolver according to the first embodiment of the present invention. FIG. 3 is a sectional view taken along the line A-A of FIG. 2. FIG. 4 is a sectional view for illustrating a state in which the resolver according to the first embodiment of the present invention is mounted to a bracket of a rotary electric machine. FIG. 5 is a sectional view for illustrating a state in which the resolver according to the first embodiment of the present invention is incorporated into the rotary electric machine. FIG. 6 is a plan view for illustrating a positional relationship between a stator core and a resolver rotor according to the first embodiment of the present invention.

First, the structure of the resolver is described with reference to FIG. 1 to FIG. 3.

The resolver includes a resolver rotor 1 formed by laminating a plurality of electromagnetic steel sheets formed through punching, and a resolver stator 2 arranged so as to surround an outer periphery of the resolver rotor 1 in an opposed manner.

The resolver stator 2 includes an annular stator core 3, a pair of insulating members 4 and 5 arranged on the stator core 3, and stator coils 6 wound on teeth 3a of the stator core 3 through intermediation of the insulating members 4 and 5.

Next, each component of the resolver stator 2 is further described in detail.

The stator core 3 is formed of a plurality of electromagnetic steel sheets laminated without rotary lamination, and an outer peripheral side and an inner peripheral side of the stator core 3 are each formed into a circular shape. The plurality of teeth 3a protruding radially inward are formed equiangularly on the inner peripheral side of the stator core 3. A radially inner side of the teeth 3a is opposed to a radially outer side of the resolver rotor 1 with a minute gap.

The insulating members 4 and 5 are made of an insulating resin, and are arranged so as to sandwich the stator core 3 from both surfaces thereof and to cover the teeth 3a.

The stator coils 6 are wound on the teeth 3a through intermediation of the insulating members 4 and 5. Each stator coil 6 includes three separate windings, that is, one excitation winding and two output windings.

Further, as illustrated in FIG. 1 and FIG. 2, a part of the insulating member 4 extends radially outward from the stator core 3, thereby constructing an extended portion 4a. Terminals 7 are formed in the extended portion 4a by insert molding. Leads 6a of the stator coils 6 are connected to terminal pins 7a of the terminals 7, respectively.

Next, with reference to FIG. 4 and FIG. 5, description is made of a state in which the resolver is mounted to the rotary electric machine being a target for rotation detection.

The resolver rotor 1 is mounted to a shaft end of a rotation shaft 9 of the rotary electric machine. The rotation shaft 9 is made of a magnetic material.

The resolver stator 2 is arranged on a rear bracket 8 of the rotary electric machine coaxially with the rotation shaft 9 while surrounding the resolver rotor 1. A magnetic pole position of a rotator 10, which is fixed on the rotation shaft 9 of the rotary electric machine, is detected based on output voltages generated in the two output windings of the stator coil 6 due to a change in a magnetic flux density distribution in the gap between the resolver rotor 1 and the resolver stator 2, which is caused along with rotation of the rotation shaft 9.

With reference to FIG. 5, an inside of the rotary electric machine is described. The rotation shaft 9 of the rotator 10 is supported in a rotatable manner by two bearings 11 arranged on the bracket side, and a field winding 10a is wound on the rotor 10. A cylindrical stator 12 having a stator winding 12a wound thereon is arranged on the outer peripheral side of the rotor 10. Further, two slip rings 13 are mounted on the rotation shaft 9, and brushes 14 are arranged to be held in slide-contact with the slip rings 13.

The above-mentioned rotary electric machine is merely an example, and is not limited to the rotary electric machine illustrated in the drawings.

Description is made of a case where the resolver according to the first embodiment of the present invention has ten slots and a shaft angle multiplier of 4× (when a shaft angle multiplier is N, the shaft angle multiplier is represented as NX) as illustrated in FIG. 6.

Next, with reference to FIG. 7 to FIG. 11, description is made of a relationship among a magnetomotive force of the resolver, a permeance, an order of each of the output windings, a rolling direction of the stator core 3, and angle detection errors.

Figure 7:
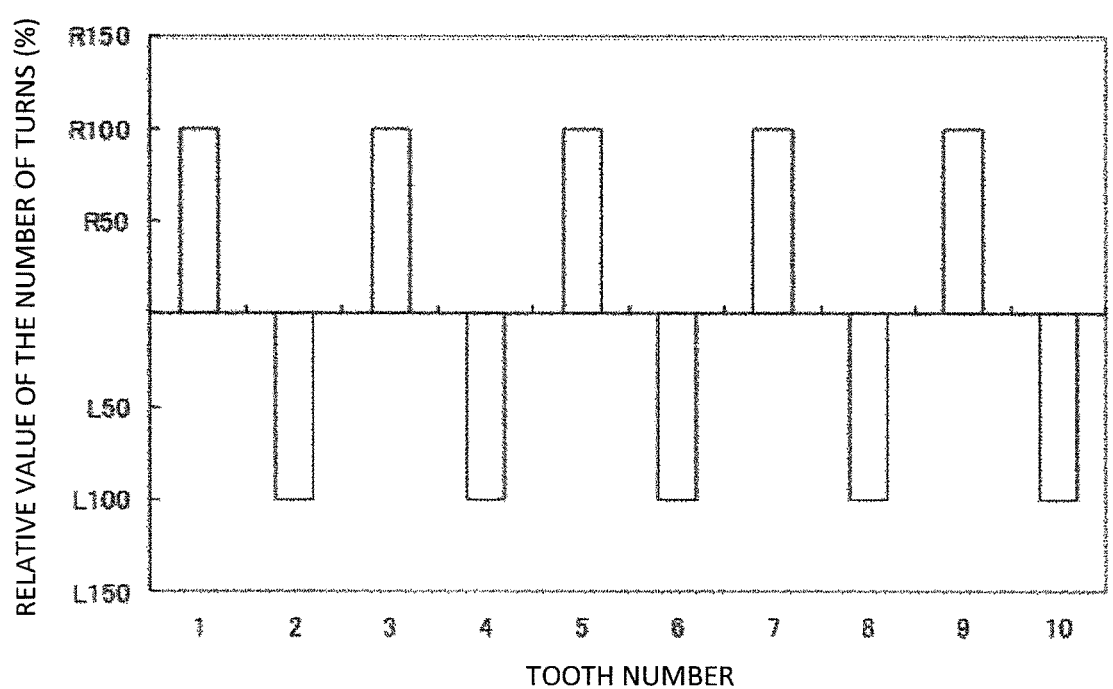
FIG. 7 is an explanatory graph for showing one example of a pattern of the numbers of turns of excitation windings wound at ten slots with a magnetomotive force order of 5 in the resolver according to the first embodiment of the present invention.
Figure 8:
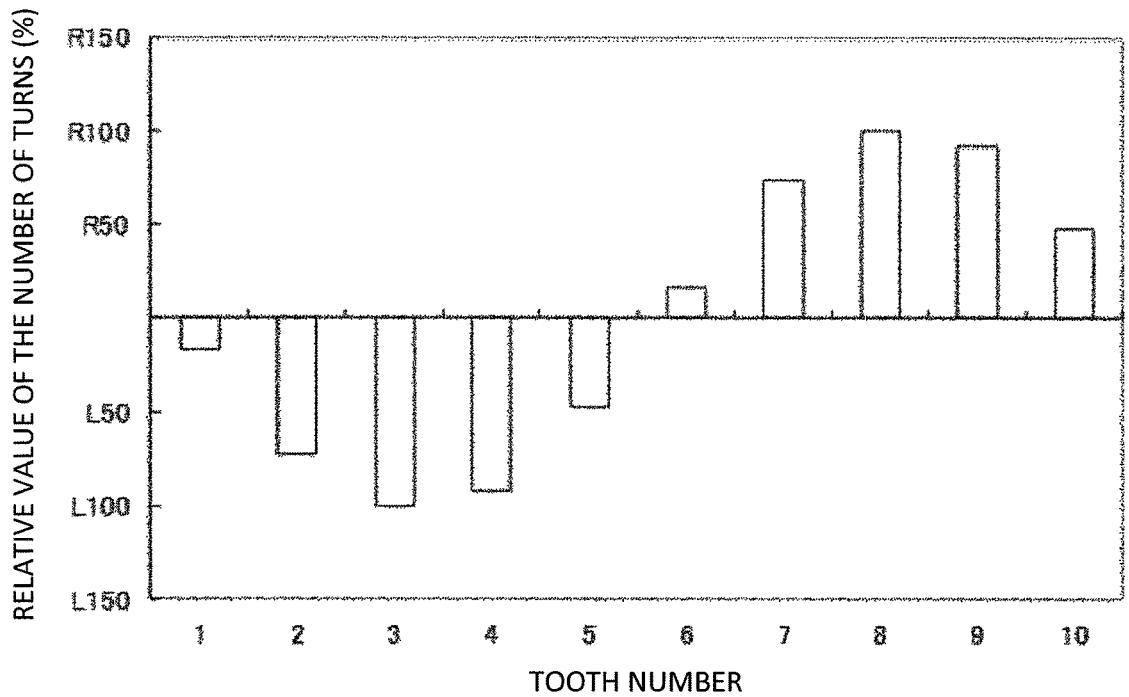
FIG. 8 is an explanatory graph for showing one example of a pattern of the numbers of turns of output windings α wound at ten slots with an output order of 1 in the resolver according to the first embodiment of the present invention.
Figure 9:
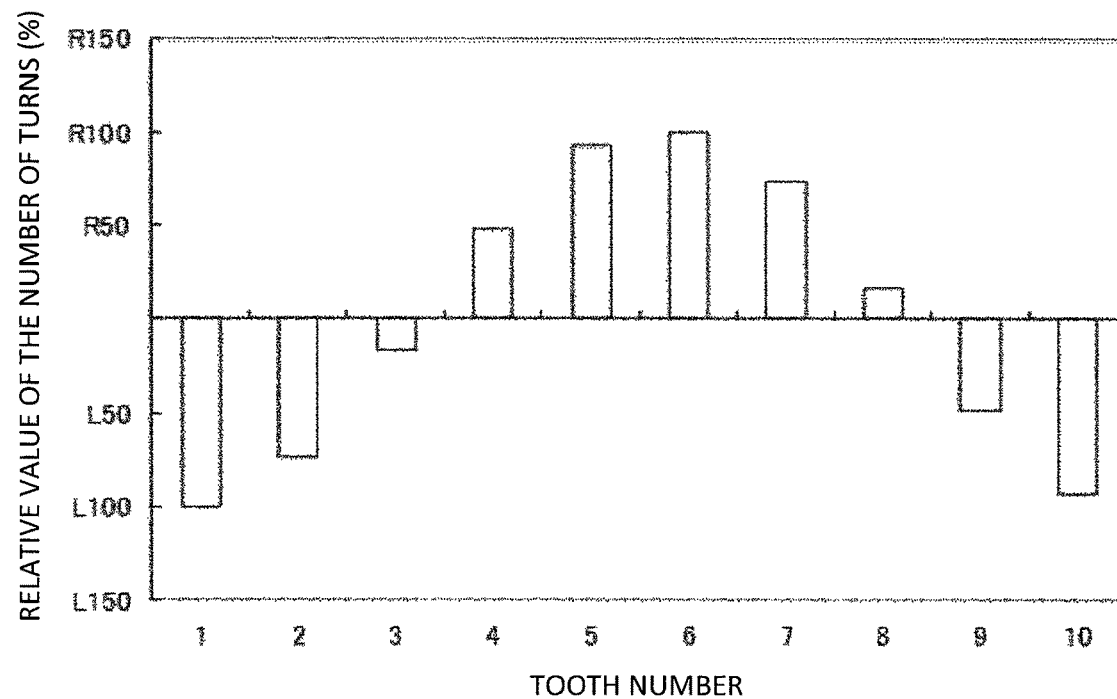
FIG. 9 is an explanatory graph for showing one example of a pattern of the numbers of turns of output windings β wound at ten slots with an output order of 1 in the resolver according to the first embodiment of the present invention.

FIG. 7 is an explanatory graph for showing one example of a pattern of the numbers of turns of the excitation windings wound at ten slots with a magnetomotive force order of 5 in the resolver according to the first embodiment of the present invention. FIG. 8 is an explanatory graph for showing one example of a pattern of the numbers of turns of output windings α wound at ten slots with an output order of 1 in the resolver according to the first embodiment of the present invention. FIG. 9 is an explanatory graph for showing one example of a pattern of the numbers of turns of output windings β wound at ten slots with an output order of 1 in the resolver according to the first embodiment of the present invention.

In the resolver including the resolver rotor 1 and the resolver stator 2 which are formed of laminated electromagnetic steel sheets, when "A" represents an order of a magnetomotive force (hereinafter referred to as magnetomotive force order) generated through energization of the excitation windings of the stator coils 6 wound on the teeth 3a of the stator core 3, and when "B" represents an order of a permeance mainly affected by a radially outer shape of the resolver rotor, that is, a shaft angle multiplier, the two output windings are wound on each of the teeth 3a in a phase shift of 90 degrees mainly with an order of any of integers equal to orders |A±B| of the magnetic flux density distribution generated in the gap between the stator core 3 and the resolver rotor 1.

Against ideal output windings that reduce angle detection errors and are wound by the order of any of the integers equal to the orders |A±B|, the number of the teeth is finite. Accordingly, in order to round off the number of turns of the windings wound on one of the teeth 3a into a nearest integer, the number of turns on any of the teeth 3a is increased or decreased by the number of several turns, to thereby adjust the number of turns so as to reduce angle detection errors.

When a leakage flux flows into the resolver rotor 1 and the resolver stator 2 through the rotation shaft 9 made of a magnetic material from the rotor 10 of the rotary electric machine including a permanent magnet and the field winding, a magnetic flux, which is noise other than a magnetic flux generated by the magnetomotive force of the excitation winding and needed for angle detection, is linked to the output windings of the stator coil 6. Accordingly, it is desired that, as an order of each of the output windings, such an order be selected as to avoid the order of the magnetic flux density distribution generated in the gap by the leakage flux.

The resolver having twelve slots and a shaft angle multiplier of 8× is illustrated in FIG. 1, and the resolver having twelve slots is illustrated in FIG. 3. However, the number of slots and the shaft angle multiplier are not limited thereto. In the following, description is made with reference to an example illustrated in FIG. 6 having ten slots and a shaft angle multiplier of 4×. In FIG. 7, there is shown an example of a pattern of the numbers of turns of the excitation windings wound at ten slots with a magnetomotive force order of 5. The order of each of the output windings may be calculated as 1 using the above-mentioned method of calculation. FIG. 8 and FIG. 9 are explanatory graphs for showing examples of patterns of the numbers of turns of the output windings α and the output windings β wound at ten slots with an output order of 1. The output winding α and the output winding β correspond to the above-mentioned two output windings. Relative values of the numbers of turns shown in FIG. 7 to FIG. 9 are values obtained by dividing the number of turns on the tooth 3a in each phase by a maximum value of the numbers of turns on the teeth 3a in the respective phases, and multiplying the resulting division by 100. R and L represent turning in opposite directions. In this example, the excitation winding, the output winding α, and the output winding β are wound in the stated order.

Figure 10:
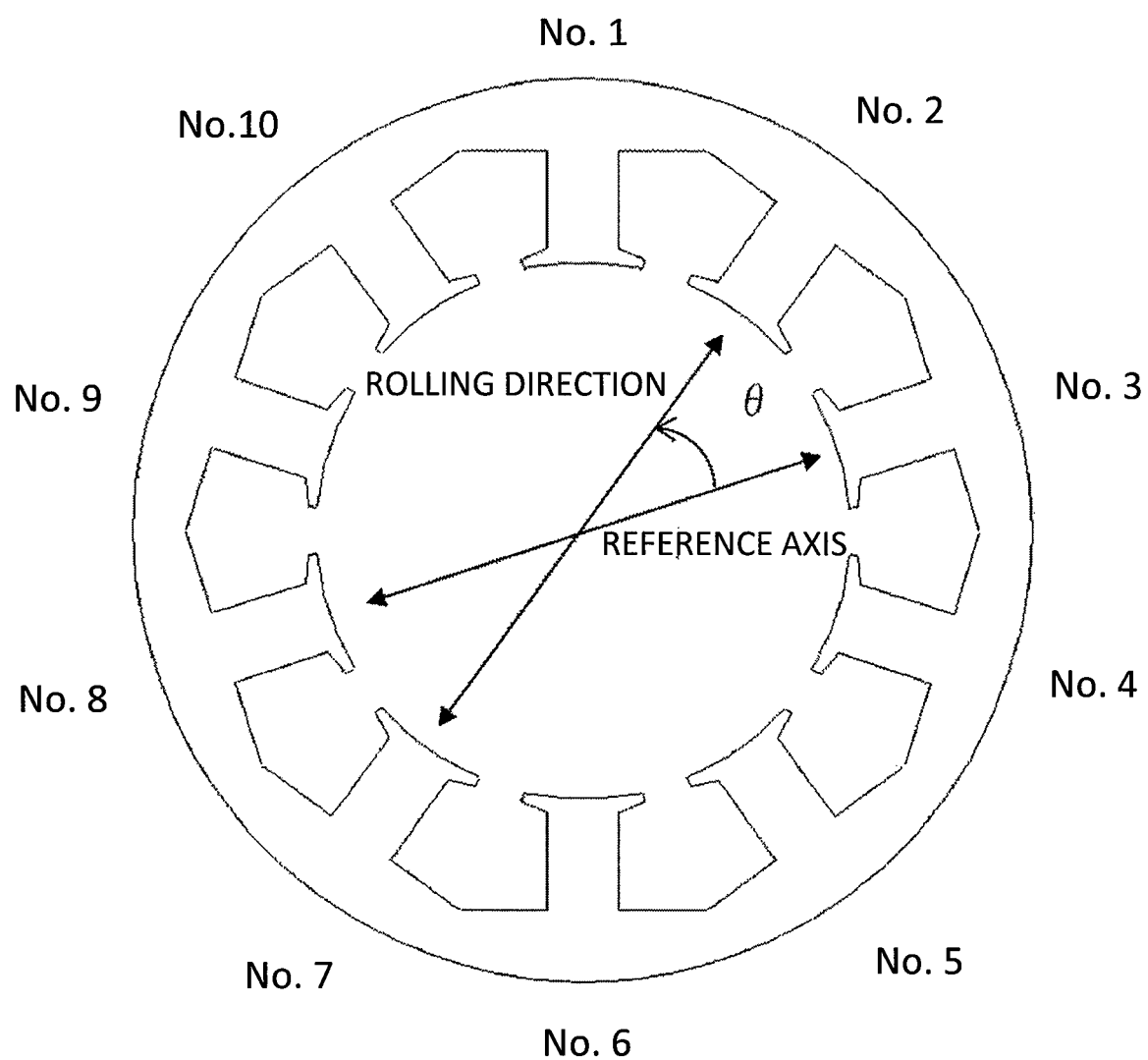
FIG. 10 is an explanatory view for illustrating a rolling direction of the stator core and relative positions of the windings in the resolver according to the first embodiment of the present invention.
Figure 11:
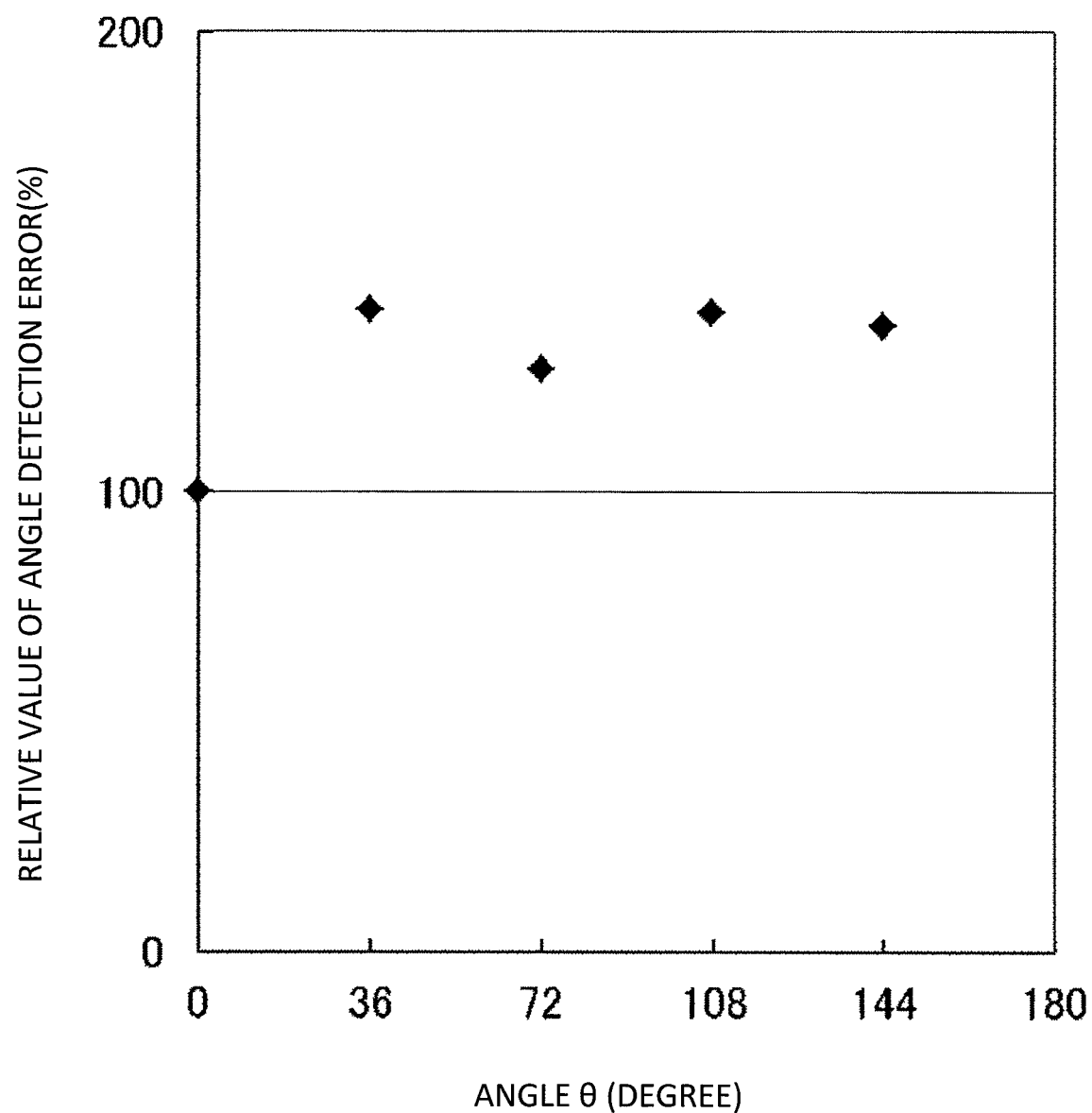
FIG. 11 is an explanatory graph for showing actual measurement results of a relationship of the rolling direction of the stator core and the relative positions of the windings to angle detection errors in the resolver according to the first embodiment of the present invention.

Now, problems in manufacturing the resolver are described. FIG. 10 is an explanatory view for illustrating the rolling direction of the stator core and relative positions of the windings in the resolver according to the first embodiment of the present invention. FIG. 11 is an explanatory graph for showing actual measurement results of a relationship of the rolling direction of the stator core and the relative positions of the windings to angle detection errors in the resolver according to the first embodiment of the present invention.

Tooth numbers (No. 1 to No. 10) illustrated in FIG. 10 correspond to tooth numbers on a horizontal axis shown in FIG. 7 to FIG. 9. In this case, a circumferential center line of the third tooth 3a is defined as a reference axis, and a difference between the rolling direction of the stator core 3 and the reference axis is defined as an angle θ. The angle θ has a positive value when the rolling direction of the stator core 3 extends on a left (counterclockwise) side of the reference axis. With reference to FIG. 10, a relative position between the rolling direction of the stator core 3 and the tooth number corresponding to the certain angle θ can be ascertained.

Each relative value of an angle detection error shown in FIG. 11 is a value obtained by dividing an angle detection error at each angle θ by a minimum value of the angle detection error, and multiplying the resulting division by 100. When differences between a detection angle of the resolver and a detection angle (real angle) of an encoder are plotted in a waveform, the angle detection error corresponds to a difference between a maximum value and a minimum value in this waveform in one rotary period of the rotor. As shown in FIG. 11, it can be seen that, when there are variations between the rolling direction of the stator core 3 and the relative positions of the windings, angle detection errors also vary.

That is, during manufacture of the resolver stator 2, unless the stator core 3 is manufactured after ascertaining the rolling direction of the stator core 3, the rolling direction of the stator core 3 and the relative positions of the windings cannot be uniformized. Consequently, due to the variations in the relative positions, angle detection errors fluctuate among respective manufactured resolvers. In order to reduce the fluctuations in angle detection errors, it is necessary to place a mark on the stator core 3 for ascertaining the rolling direction of the stator core 3.

Further, shear drops and burrs are formed in punching of the electromagnetic steel sheets forming the stator core 3. Accordingly, even the stator core 3 obtained by laminating the electromagnetic steel sheets has front and back surfaces. Unless each resolver is manufactured under a state in which a front and a back of the stator core 3 are uniformized, assembly accuracy of the resolver is degraded, and angle detection errors are increased. As a countermeasure for this, it is necessary to place a mark on the stator core 3 in order to distinguish the front and the back of the stator core 3.

Next, with reference to FIG. 12 to FIG. 17, description is made of a mark placed on the stator core 3 being a feature of the present invention.

Figure 12:
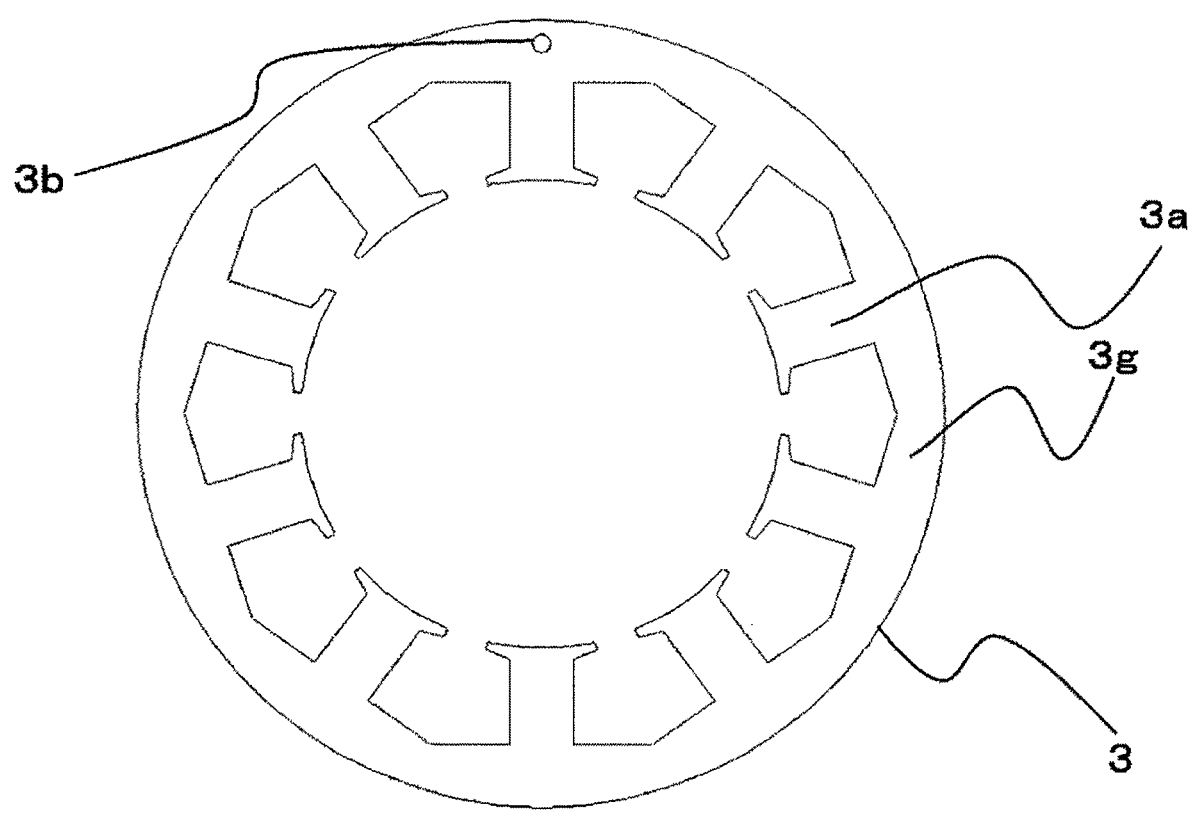
FIG. 12 is a plan view of the stator core according to the first embodiment of the present invention.
Figure 13:
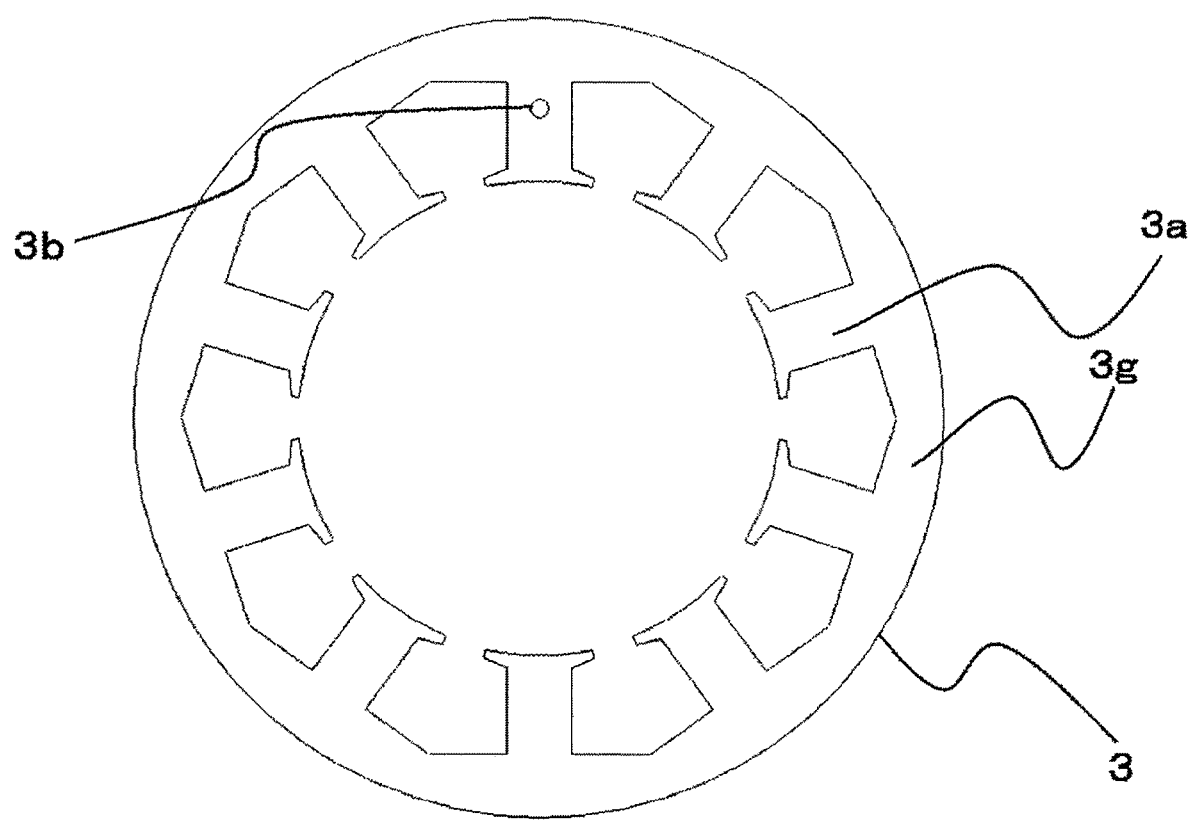
FIG. 13 is a plan view of a stator core according to a modified example of the first embodiment of the present invention.
Figure 14:
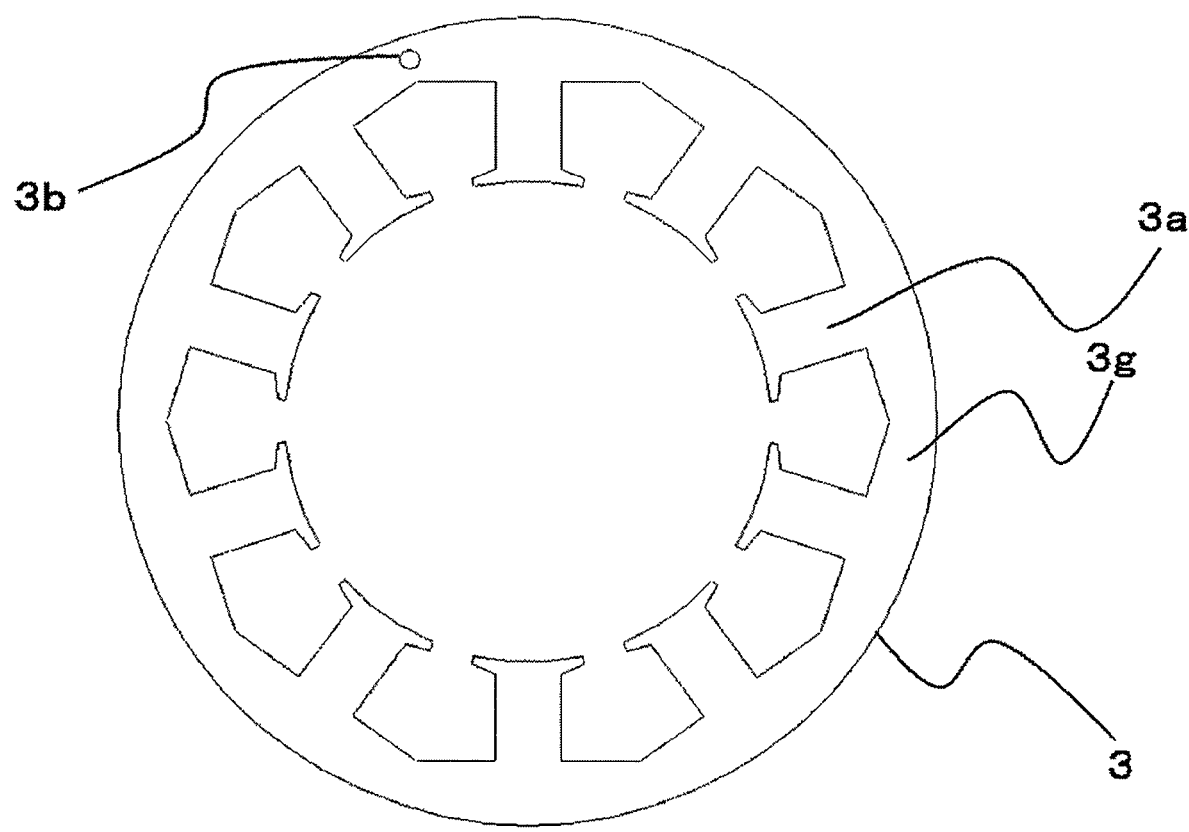
FIG. 14 is a plan view of a stator core according to another modified example of the first embodiment of the present invention.
Figure 15:
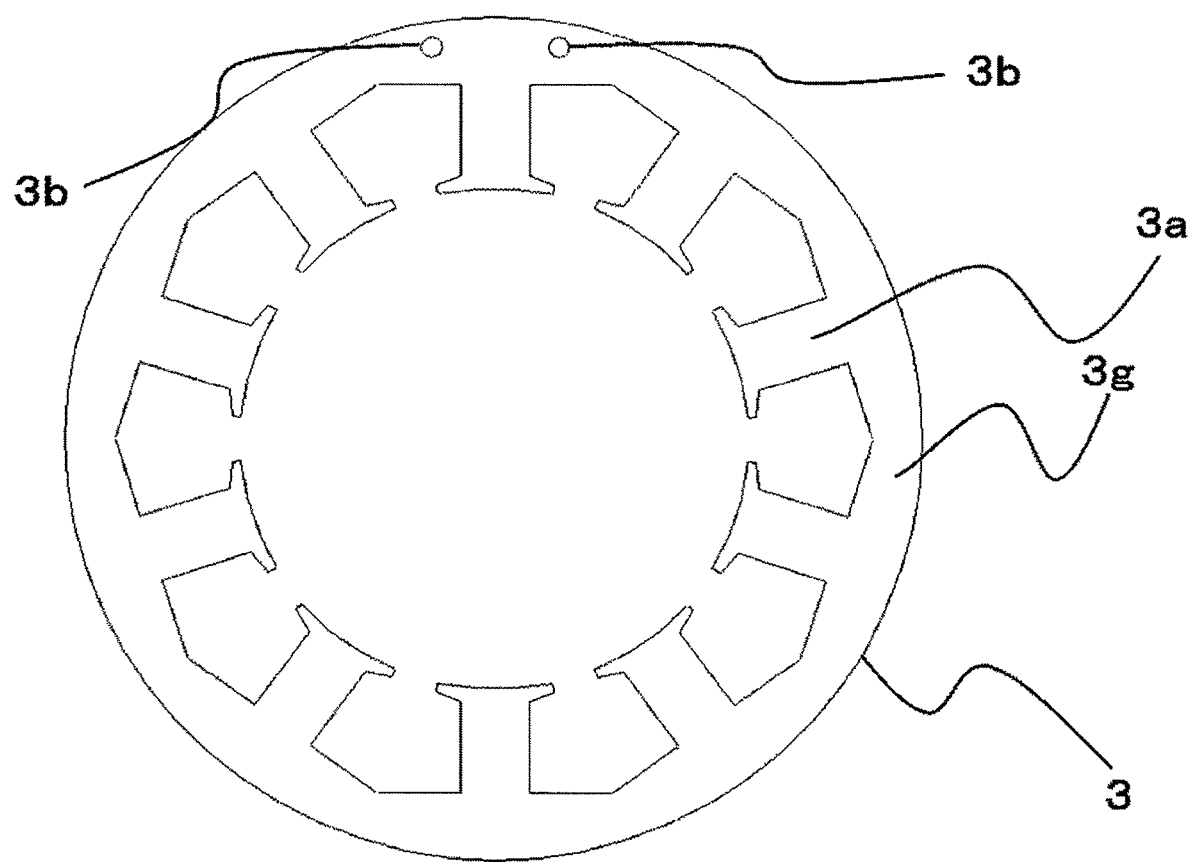
FIG. 15 is a plan view of a stator core according to another modified example of the first embodiment of the present invention.
Figure 16:
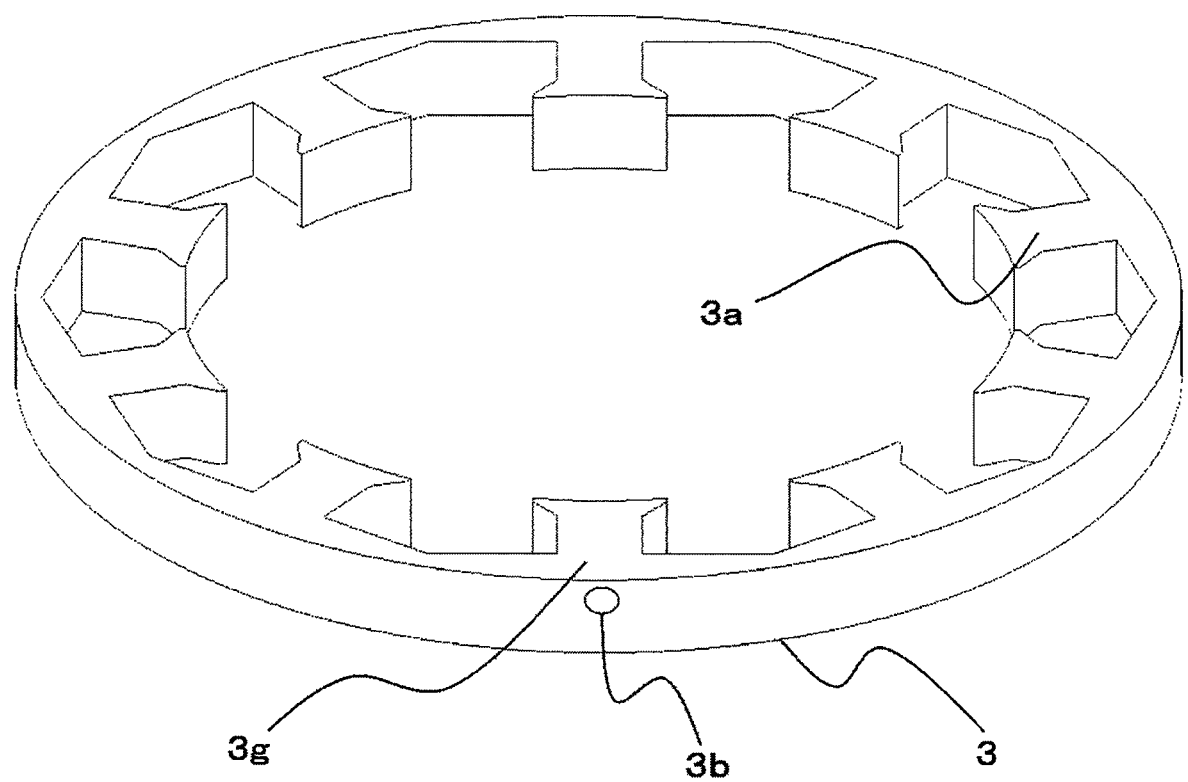
FIG. 16 is a perspective view of a stator core according to another modified example of the first embodiment of the present invention.
Figure 17:
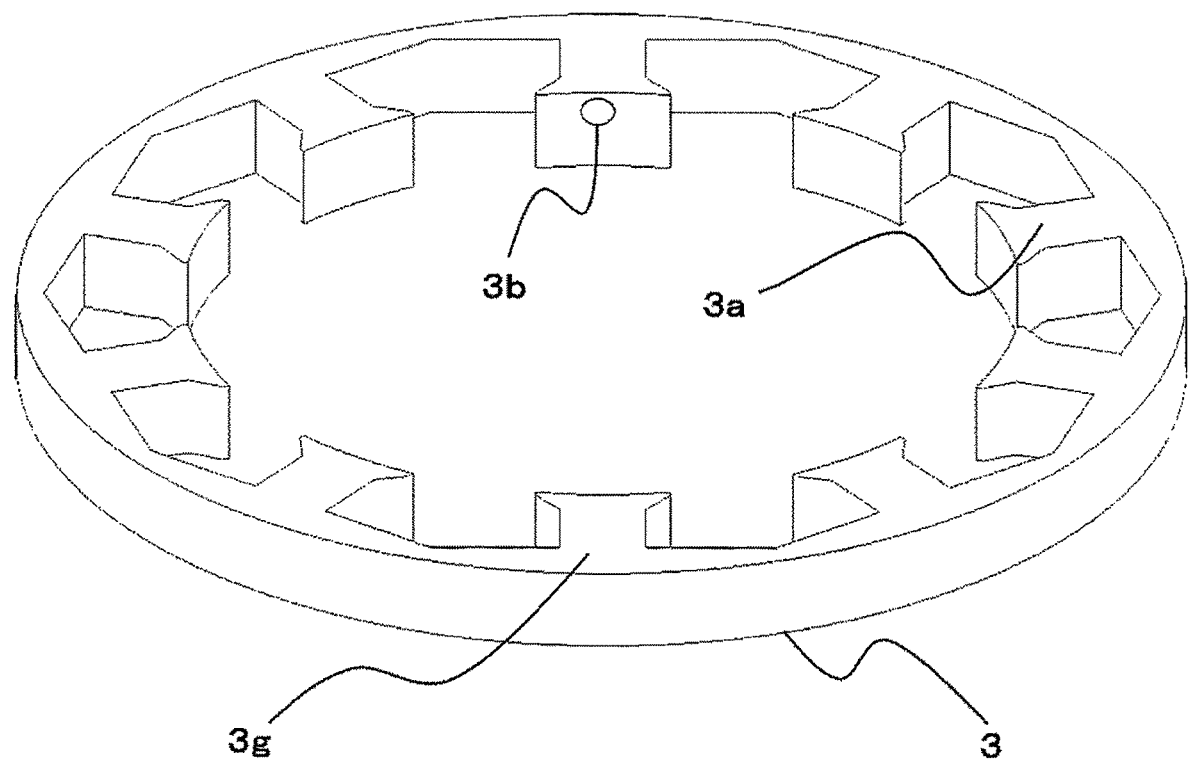
FIG. 17 is a perspective view of a stator core according to another modified example of the first embodiment of the present invention.

FIG. 12 is a plan view of the stator core according to the first embodiment of the present invention. FIG. 13 to FIG. 15 are plan views of stator cores according to modified examples of the first embodiment of the present invention. FIG. 16 and FIG. 17 are perspective views of stator cores according to yet another modified example of the first embodiment of the present invention.

The mark according to the present invention includes a mark that serves as joining means for the stator core 3, and a mark that does not serve as the joining means. For example, the mark that serves as the joining means includes caulking, welding, and bolt fixation. The mark that does not serve as joining means includes a printed mark, a notch, a protruding portion, and a hole (referring to a through-hole unless otherwise noted).

FIG. 12 is an illustration of an example of placing, as the mark, a printed mark 3b on the stator core 3. The printed mark 3b refers not only to a character and a symbol but also to a printed or applied mark. In FIG. 12, one printed mark 3b is placed on a portion of a core back 3g of the stator core 3 where one of the teeth 3a is located. In FIG. 13, one printed mark 3b is placed on one of the teeth 3a. In FIG. 14, one printed mark 3b is placed on a portion of the core back 3g of the stator core 3 between the adjacent teeth 3a. In FIG. 15, two printed marks 3b are placed on portions of the core back 3g where one of the teeth 3a is located. In FIG. 16, one printed mark 3b is placed on an upper half of an outer peripheral surface of the stator core 3 of the resolver of an inner rotor type. In FIG. 17, one printed mark 3b is placed on an upper half of an inner peripheral surface of the stator core 3.

As described above, in FIG. 12 to FIG. 17, the marks (printed marks 3b) are placed on the stator core 3 so as to enable distinction of the rolling direction and the front and the back of the stator core 3. In other words, when the stator core 3 is rotated about the rotation shaft of the resolver rotor 1 by an arbitrary angle larger than 0 degrees and smaller than 360 degrees so that the teeth 3a overlap each other, a position of at least one of the marks (printed marks 3b) does not match to positions of the other marks before and after rotation. When the stator core 3 in a reversed state is rotated about the rotation shaft of the resolver rotor 1 by the arbitrary angle, and then the stator core 3 in an unreversed state and the stator core 3 in the reversed and rotated state are arranged so that the teeth 3a overlap each other, a position of at least one of the marks (printed marks 3b) does not match to positions of the other marks.

In other words, when a rotational position of the mark of the stator core 3 is improper with respect to a proper position of the mark (printed mark 3b) of the stator core 3, or when the stator core 3 is reversed, based on the fact that the position of the mark (printed mark 3b) is improper, the rotational position of the mark can be ascertained, and the front and the back of the stator core 3 can be distinguished.

With this configuration, the rotational position of the stator core 3 can be ascertained, and the front and the back of the stator core 3 can be distinguished. Accordingly, assembly accuracy of the resolver can be improved by matching directions of shear drops and burrs, with the result that angle detection errors can be reduced. Further, the stator core 3 is formed of the electromagnetic steel sheets laminated without rotary lamination. Thus, productivity and assembling ability are improved. In addition, the rotational position of the stator core 3 can be ascertained, thereby being capable of ascertaining the positions of the windings and the relative positions of the windings to the rolling direction of the stator core 3. Accordingly, the positions of the windings and the relative positions to the rolling direction of the stator core 3 can be uniformized in all of the respective resolvers. Consequently, fluctuations in angle detection errors can be reduced.

In FIG. 12 to FIG. 17, when the electromagnetic steel sheets to be laminated are fixed to each other, as the electromagnetic steel sheets, there are used adhesive electromagnetic steel sheets that are preliminarily coated with adhesive on surfaces thereof, and are adherable by pressurization, heating, or the like. When electromagnetic steel sheets other than the adhesive electromagnetic steel sheets (hereinafter, referred to as typical electromagnetic steel sheets) are used (when merely the term "electromagnetic steel sheet" is described, the term may refer to any of a typical electromagnetic steel sheet and an adhesive electromagnetic steel sheet), the electromagnetic steel sheets may be joined to each other by caulking, welding, bolt fixation, or the like. When the adhesive electromagnetic steel sheets are used, caulking or the like is not needed. Accordingly, there is no magnetic degradation caused by joining performed by caulking or the like, thereby being capable of reducing angle detection errors as compared to a case where magnetic degradation occurs. Meanwhile, when joining is performed by caulking or the like, typical electromagnetic steel sheets may be used. Accordingly, a step and equipment for pressurization or heating that are needed to bond the adhesive electromagnetic steel sheets can be omitted.

In this embodiment and the modified examples, description is made of a case where the number of the printed marks 3b serving as the marks is one or two, and the printed marks 3b are placed on one surface (axial upper end surface of the stator core 3). However, the number and arrangement of the marks and the number of the surface having the marks are not limited thereto. It is only necessary that the mark be placed on the stator core 3 so as to enable distinction of the rolling direction and the front and the back of the stator core 3. In other words, it is only necessary that the following conditions be satisfied. When the stator core 3 is rotated about the rotation shaft of the resolver rotor 1 by the arbitrary angle larger than 0 degrees and smaller than 360 degrees so that the teeth 3a overlap each other, a position of at least one of the marks does not match to positions of the other marks before and after rotation. Further, when the stator core 3 in a reversed state is rotated about the rotation shaft of the resolver rotor 1 by the arbitrary angle, and then the stator core 3 in an unreversed state and the stator core 3 in the reversed and rotated state are arranged so that the teeth 3a overlap each other, a position of at least one of the marks does not match to positions of the other marks.

Further, even in a case where the adhesive electromagnetic steel sheets are used, and a notch, a protruding portion, a hole, or the like is formed as the mark in place of the printed mark 3b, when whether or not a mark passes through each of the adhesive electromagnetic steel sheets in an axial direction can be adjusted instead of forming the mark in an axially piercing manner, the same arrangement as that of the above-mentioned printed marks 3b can be adopted. In this case, it is not necessary to place the printed marks 3b. Accordingly, a printing step and equipment required for printing can be omitted.

Second Embodiment

Figure 18:
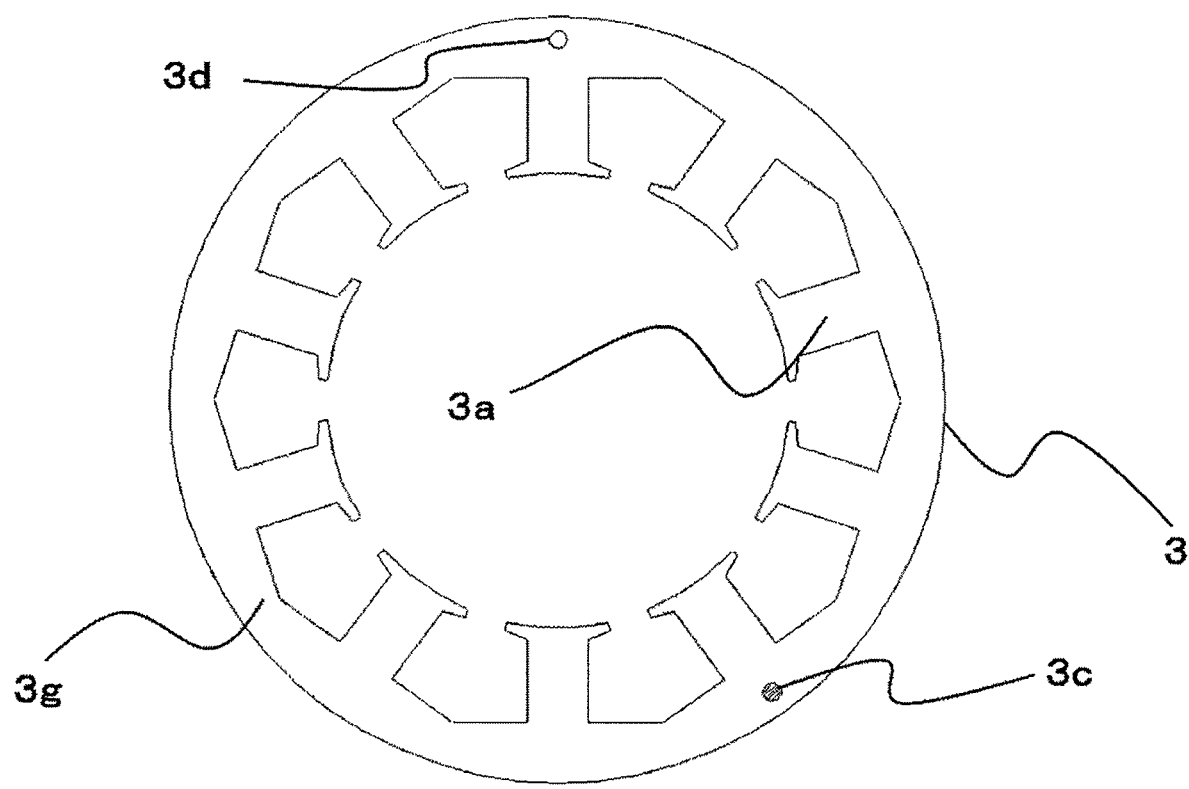
FIG. 18 is a plan view of a stator core according to a second embodiment of the present invention.

Now, a second embodiment of the present invention is described with reference to FIG. 18. FIG. 18 is a plan view of a stator core according to the second embodiment of the present invention.

Here, a printed mark and a mark other than the printed mark are described. The printed mark is, namely, a mark that does not change a magnetic property of the stator core before and after placing the mark. The mark other than the printed mark is, namely, a mark that changes the magnetic property of the stator core before and after placing the mark.

In the second embodiment and the following embodiments, the term "mark" refers to a mark other than the printed mark unless otherwise noted. That is, the printed mark is also the mark that does not serve as the joining means. However, in the second embodiment and the following embodiments, unless otherwise noted, the printed mark is not included in the mark that does not serve as joining means.

In this embodiment, as a case where a mark other than the printed mark is used as the mark, description is made of a case where a caulk 3c is used as the mark that serves as the joining means for the stator core 3, and a hole 3d is used as the mark that does not serve as the joining means.

The second embodiment is the same as the first embodiment regarding the number of slots of 10, the shaft angle multiplier of 4, and the number of turns, but the present invention is not limited thereto.

In the first embodiment, description is made of the case where whether or not a mark passes through each of the electromagnetic steel sheets in the axial direction can be adjusted instead of forming the mark in an axially piercing manner even in the case where a notch, a protruding portion, a hole, or the like is formed as the mark in place of the printed mark. However, manufacturing steps can be simplified when each mark is formed to have the same depth in the axial direction. Thus, in this embodiment, description is made of a case where each mark has the same depth in the axial direction irrespective of whether or not the formed mark is used as the mark.

Further, irregularities are formed by the caulk 3c on an axial end surface of the stator core 3. Thus, the front and the back of the stator core 3 can be distinguished based only on the irregularities formed by the caulk 3c. However, distinction based on combination of the caulk 3c and another mark, or based on a mark other than the caulk 3c, is easier. Accordingly, in the following, the front and the back of the stator core 3 are not distinguished based only on the irregularities formed by the caulk 3c.

In FIG. 18, one hole 3d is formed in the core back 3g so that a center of the hole 3d is positioned on a circumferential center line of one of the teeth 3a. One caulk 3c is arranged in the core back 3g so that a center of the caulk 3c is positioned on a circumferential center line of one of the teeth 3a. Further, combination of arrangement of the hole 3d and the caulk 3c is used as the mark for ascertaining the rotational position of the stator core 3 and for distinguishing the front and the back of the stator core 3.

Each of the center of the hole 3d and the center of the caulk 3c may be positioned at a middle portion between circumferential centers of the adjacent teeth 3a similarly to the position of the printed mark 3b illustrated in FIG. 14.

Also with this configuration, the front and the back of the stator core 3 can be distinguished. Accordingly, assembly accuracy of the resolver can be improved by matching directions of shear drops and burrs, with the result that angle detection errors can be reduced. Further, the stator core 3 is formed of the electromagnetic steel sheets laminated without rotary lamination. Thus, productivity and assembling ability are improved. In addition, the rotational position of the stator core 3 can be ascertained, thereby being capable of ascertaining the positions of the windings and the relative positions of the windings to the rolling direction of the stator core 3. Accordingly, the positions of the windings and the relative positions to the rolling direction of the stator core 3 can be uniformized in all of the respective resolvers. Consequently, fluctuations in angle detection errors can be reduced.

Further, the caulk 3c and the hole 3d serving as the marks are formed in the core back 3g. Accordingly, as compared to a case where the caulk 3c and the hole 3d are formed in the teeth 3a, the magnetic flux more easily passes through the stator core 3, with the result that angle detection accuracy errors can be reduced.

In addition, the center of each of the caulk 3c and the hole 3d serving as the marks is on the circumferential center line of one of the teeth 3a. Accordingly, as compared to a case where the center of each of the caulk 3c and the hole 3d is not on the circumferential center line of one of the teeth 3a, a magnetic path can be symmetrical, with the result that angle detection errors can be reduced. The same effect is obtained also when the center of each of the caulk 3c and the hole 3d serving as the marks is at a middle portion between circumferential centers of the adjacent teeth 3a, and the magnetic path can be symmetrical as compared to a case where the center of each of the caulk 3c and the hole 3d is not at the middle portion between the circumferential centers of the adjacent teeth 3a. Consequently, angle detection errors can be reduced.

Further, in a case where the typical electromagnetic steel sheets are used, and a center of the mark is arranged on any one of the circumferential center line of one of the teeth 3a and the middle portion between the circumferential centers of the adjacent teeth 3a, three or more marks that serve as the joining means are needed when the marks with the same size are formed at equivalent radial positions. However, when combination of the caulk 3c and the hole 3d is used as the marks as in the second embodiment, two or less marks are sufficient for the marks, thereby being capable of reducing the total number of marks.

Thus, as compared to a case where the number of marks is large, reluctance of the stator core 3 is reduced. As a result, the magnetic flux easily passes, and angle detection errors can be reduced.

Although not shown, marks can be sometimes arranged symmetrically when the total number of the marks is set to three or more. As compared to a case where the marks are arranged asymmetrically, angle detection errors can be reduced.

Further, the typical electromagnetic steel sheets may be used because the electromagnetic steel sheets are joined together by the caulk 3c. Accordingly, a step and equipment for pressurization or heating that are needed to bond the adhesive electromagnetic steel sheets can be omitted.

In this embodiment, description is made of the case where the total number of marks is two, and the marks are placed on two surfaces (axial upper and lower end surfaces of the stator core 3). However, the number and arrangement of the marks, and the number of the surfaces having the marks are not limited thereto. It is only necessary that the mark be placed on the stator core 3 so as to enable distinction of the rolling direction and the front and the back of the stator core 3. In other words, it is only necessary that the following conditions be satisfied. When the stator core 3 is rotated about the rotation shaft of the resolver rotor 1 by the arbitrary angle larger than 0 degrees and smaller than 360 degrees so that the teeth 3*a* overlap each other, a position of at least one of the marks does not match to positions of the other marks before and after rotation. Further, when the stator core 3 in a reversed state is rotated about the rotation shaft of the resolver rotor 1 by the arbitrary angle, and then the stator core 3 in an unreversed state and the stator core 3 in the reversed and rotated state are arranged so that the teeth 3*a* overlap each other, a position of at least one of the marks does not match to positions of the other marks.

Third Embodiment

Figure 19:
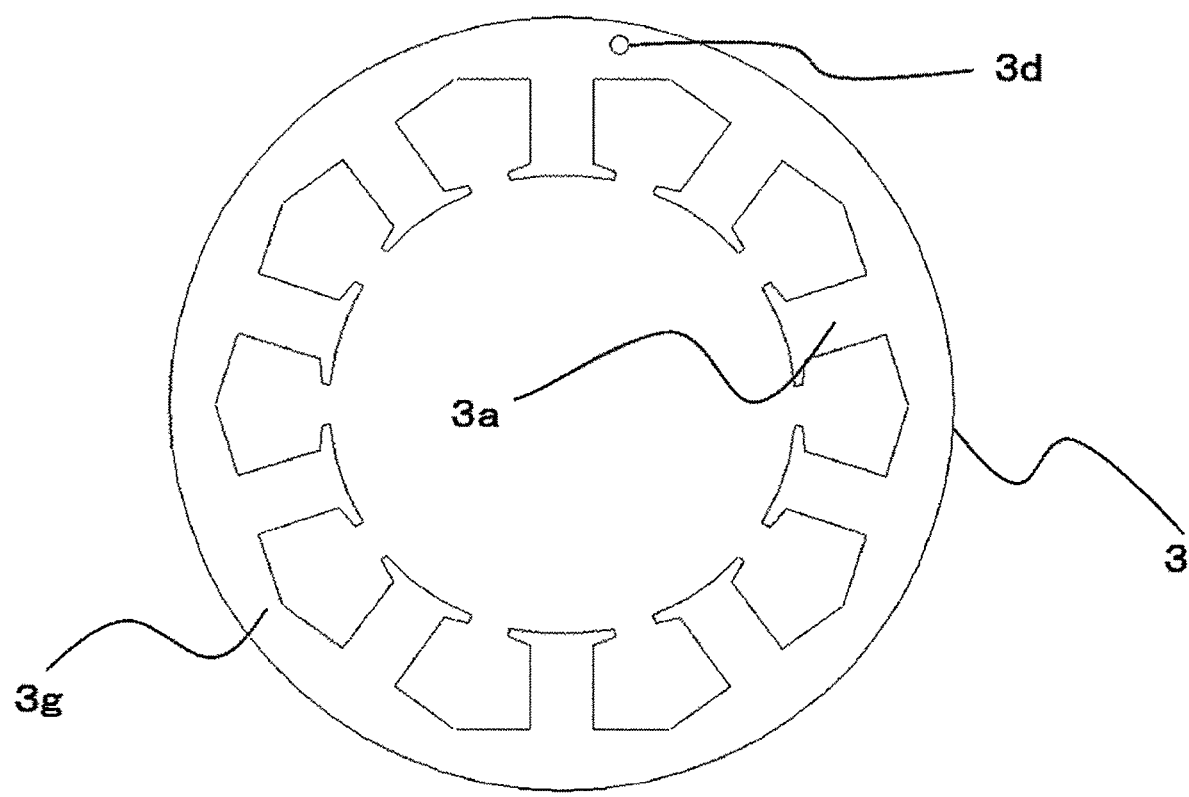
FIG. 19 is a plan view of a stator core according to a third embodiment of the present invention.

Now, a third embodiment of the present invention is described with reference to FIG. 19. FIG. 19 is a plan view of a stator core according to the third embodiment of the present invention.

In this embodiment, description is made of a case where only any one of the mark that serves as the joining means, and the mark that does not serve as the joining means is used as the mark. However, when the mark that does not serve as the joining means is used as the mark, means (such as caulking, welding, or bolt fixation) usable as the mark that serves as the joining means may be used at the same time.

In FIG. 19, one hole 3*d* is formed in the core back 3*g* of the stator core formed of the adhesive electromagnetic steel sheets. The hole 3*d* is used as the mark for ascertaining the rotational position of the stator core 3 and for distinguishing the front and the back of the stator core 3. It is only necessary that a center of the mark be neither on a circumferential center line of one of the teeth 3*a* nor at a middle portion between circumferential centers of the adjacent teeth 3*a*.

Also with this configuration, the front and the back of the stator core 3 can be distinguished. Accordingly, assembly accuracy of the resolver can be improved by matching directions of shear drops and burrs, with the result that angle detection errors can be reduced. Further, the stator core 3 is formed of the electromagnetic steel sheets laminated without rotary lamination. Thus, productivity and assembling ability are improved. In addition, the rotational position of the stator core 3 can be ascertained, thereby being capable of ascertaining the positions of the windings and the relative positions of the windings to the rolling direction of the stator core 3. Accordingly, the positions of the windings and the relative positions to the rolling direction of the stator core 3 can be uniformized in all of the respective resolvers. Consequently, fluctuations in angle detection errors can be reduced.

In addition, even one hole 3*d* is sufficient for the mark. Thus, as compared to a case where two or more marks are placed, reluctance of the stator core 3 is reduced. As a result, the magnetic flux easily passes, and angle detection errors can be reduced.

Further, the adhesive electromagnetic steel sheets are used in FIG. 19. However, the typical electromagnetic steel sheets may be used, and the typical electromagnetic steel sheets may be joined together by caulking or the like. In this case, a step and equipment for pressurization or heating that are needed to bond the adhesive electromagnetic steel sheets can be omitted.

Alternatively, in place of the hole 3*d*, a caulk may be used as the mark, and the typical electromagnetic steel sheets may be used in place of the adhesive electromagnetic steel sheets. In this case, a step and equipment for pressurization or heating that are needed to bond the adhesive electromagnetic steel sheets can be omitted.

Needless to say, the hole 3*d* may be used as the mark as it is, and the typical electromagnetic steel sheets substituted for the adhesive electromagnetic steel sheets may be joined together by caulking or the like.

Also in this embodiment, the number and arrangement of the marks, and the number of surfaces having the mark are not limited thereto. It is only necessary that the mark be placed on the stator core 3 so as to enable distinction of the rolling direction and the front and the back of the stator core 3. In other words, it is only necessary that the following conditions be satisfied. When the stator core 3 is rotated about the rotation shaft of the resolver rotor 1 by the arbitrary angle larger than 0 degrees and smaller than 360 degrees so that the teeth 3*a* overlap each other, a position of at least one of the marks does not match to positions of the other marks before and after rotation. Further, when the stator core 3 in a reversed state is rotated about the rotation shaft of the resolver rotor 1 by the arbitrary angle, and then the stator core 3 in an unreversed state and the stator core 3 in the reversed and rotated state are arranged so that the teeth 3*a* overlap each other, a position of at least one of the marks does not match to positions of the other marks.

Fourth Embodiment

Figure 20:
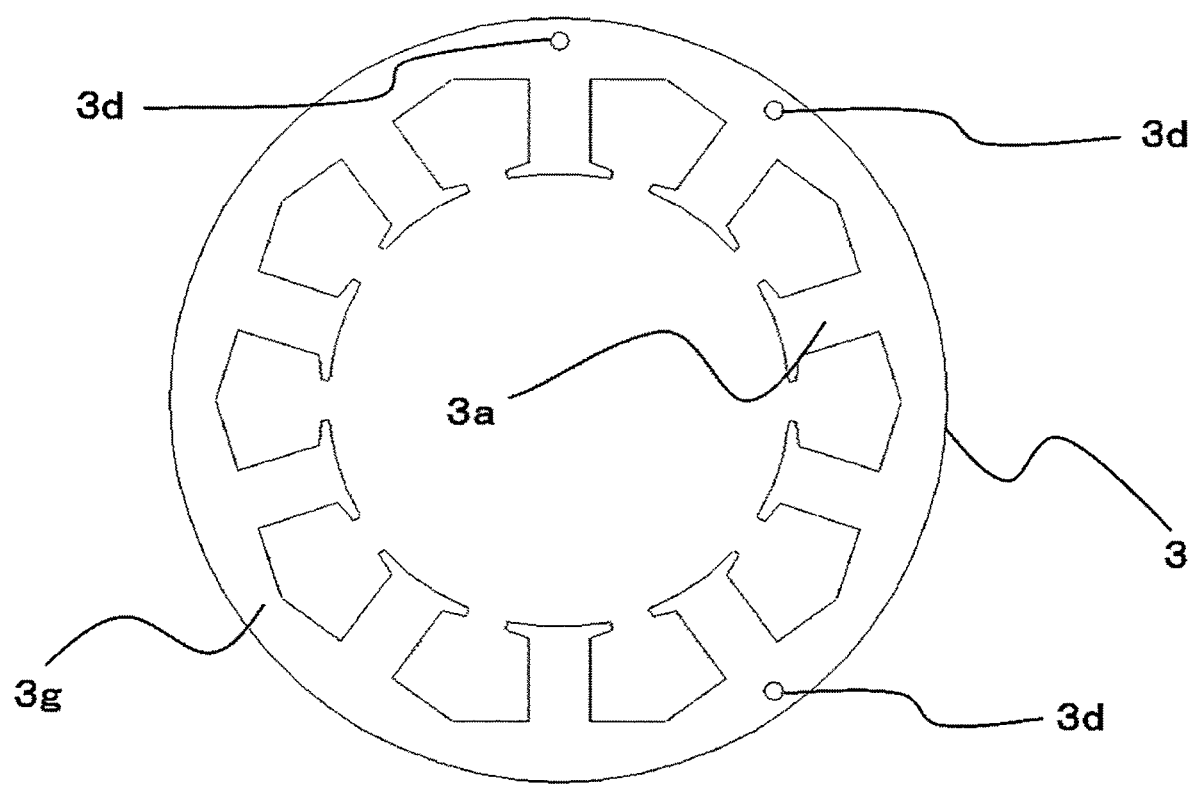
FIG. 20 is a plan view of a stator core according to a fourth embodiment of the present invention.

Now, a fourth embodiment of the present invention is described with reference to FIG. 20. FIG. 20 is a plan view of a stator core according to the fourth embodiment of the present invention.

In the fourth embodiment, description is made of a case where only any one of the mark that serves as the joining means, and the mark that does not serve as the joining means is used as the mark, and where a center of the mark is on a circumferential center line of one of the teeth 3*a* or at a middle portion between circumferential centers of the adjacent teeth 3*a*.

In FIG. 20, three holes 3*d* are formed in the core back 3*g* of the stator core 3. The holes 3*d* are used as the marks for ascertaining the rotational position of the stator core 3 and for distinguishing the front and the back of the stator core 3. A center of each mark is on a circumferential center line of one of the teeth 3*a*, but the center of each mark may be at a middle portion between circumferential centers of the adjacent teeth 3*a*.

Also with this configuration, the front and the back of the stator core 3 can be distinguished. Accordingly, assembly accuracy of the resolver can be improved by matching directions of shear drops and burrs, with the result that angle detection errors can be reduced. Further, the stator core 3 is formed of the electromagnetic steel sheets laminated without rotary lamination. Thus, productivity and assembling ability are improved. In addition, the rotational position of the stator core 3 can be ascertained, thereby being capable of ascertaining the positions of the windings and the relative positions of the windings to the rolling direction of the stator core 3. Accordingly, the positions of the windings and the relative positions to the rolling direction of the stator core 3 can be uniformized in all of the respective resolvers. Consequently, fluctuations in angle detection errors can be reduced.

In addition, the center of each mark is on the circumferential center line of one of the teeth 3a. Thus, the magnetic path is symmetrical, with the result that angle detection errors are reduced. The same effect is obtained even when each mark is at the middle portion between the circumferential centers of the adjacent teeth 3a.

Further, the adhesive electromagnetic steel sheets are used in FIG. 20. However, the holes 3d may be formed as they are, and in place of the adhesive electromagnetic steel sheets, the typical electromagnetic steel sheets may be used and joined together by caulking or the like. In this case, a step and equipment for pressurization or heating that are needed to bond the adhesive electromagnetic steel sheets can be omitted.

Alternatively, instead of the holes 3d of FIG. 20, a caulk may be used, and the typical electromagnetic steel sheets may be used in place of the adhesive electromagnetic steel sheets. In this case, a step and equipment for pressurization or heating that are needed to bond the adhesive electromagnetic steel sheets can be omitted.

Further, as compared to a case where the holes 3d are formed as they are as illustrated in FIG. 20, and the typical electromagnetic steel sheets substituted for the adhesive electromagnetic steel sheets are joined together by caulking or the like, reluctance of the stator core 3 is reduced. As a result, the magnetic flux easily passes, and angle detection errors can be reduced.

With reference to FIG. 20, description is made of the case where the total number of the marks (holes 3d) is three and the marks (holes 3d) are placed on two surfaces (axial upper and lower end surfaces), and where the center of each mark is on the circumferential center line of one of the teeth 3a. However, the center of each mark may be at the middle portion between the circumferential centers of the adjacent teeth 3a, and the number and arrangement of the marks, and the number of the surfaces having the marks are not limited thereto. It is only necessary that the marks be placed on the stator core 3 so as to enable distinction of the rolling direction and the front and the back of the stator core 3. In other words, it is only necessary that the following conditions be satisfied. When the stator core 3 is rotated about the rotation shaft of the resolver rotor 1 by the arbitrary angle larger than 0 degrees and smaller than 360 degrees so that the teeth 3a overlap each other, a position of at least one of the marks does not match to positions of the other marks before and after rotation. Further, when the stator core 3 in a reversed state is rotated about the rotation shaft of the resolver rotor 1 by the arbitrary angle, and then the stator core 3 in an unreversed state and the stator core 3 in the reversed and rotated state are arranged so that the teeth 3a overlap each other, a position of at least one of the marks does not match to positions of the other marks.

Fifth Embodiment

Figure 21:
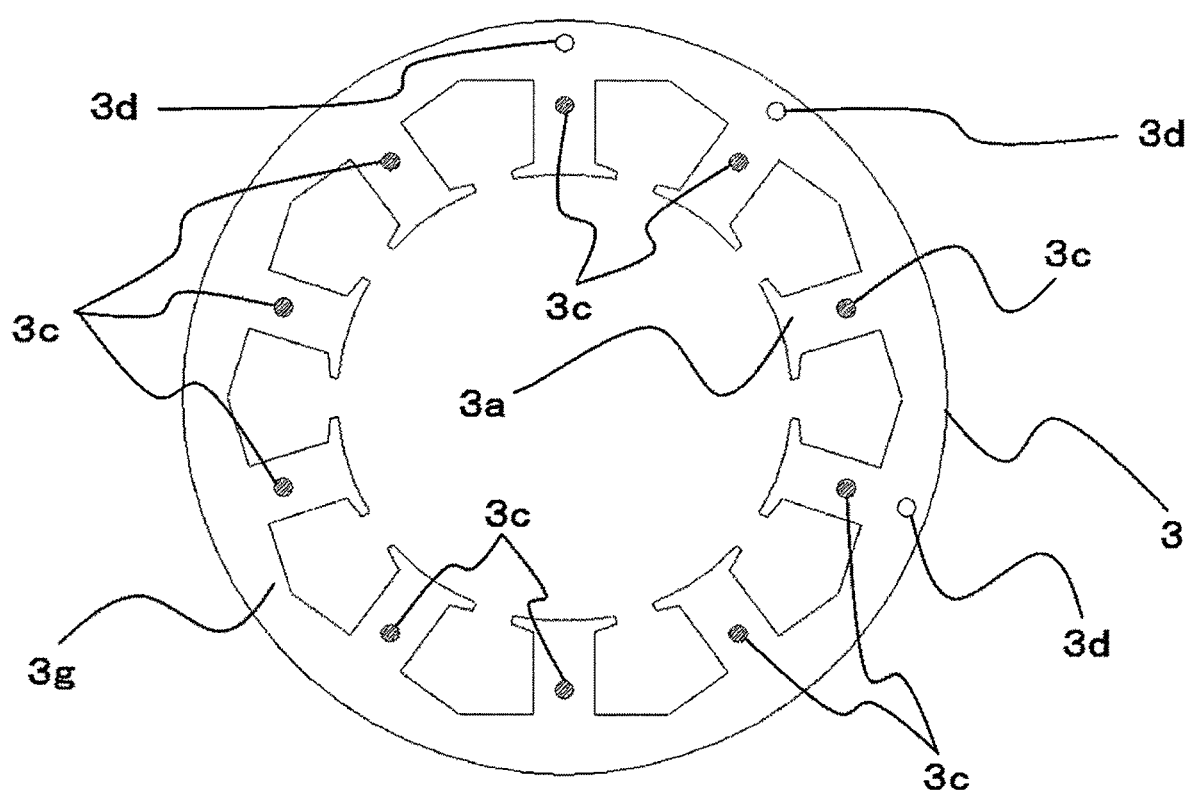
FIG. 21 is a plan view of a stator core according to a fifth embodiment of the present invention.

Now, a fifth embodiment of the present invention is described with reference to FIG. 21. FIG. 21 is a plan view of a stator core according to the fifth embodiment of the present invention.

In the fifth embodiment, description is made of a case where only any one of the mark (caulk 3c) that serves as the joining means, and the mark (hole 3d) that does not serve as the joining means is used as the mark, and where the caulk 3c is arranged on every tooth 3a.

In FIG. 21, three holes 3d are formed in the core back 3g of the stator core 3. The holes 3d are used as the marks for ascertaining the rotational position of the stator core 3 and for distinguishing the front and the back of the stator core 3. A center of each mark is on a circumferential center line of one of the teeth 3a, but the center of each mark may be at a middle portion between circumferential centers of the adjacent teeth 3a. The typical electromagnetic steel sheets are used as the electromagnetic steel sheets, and every tooth 3a is joined by the caulk 3c at one portion thereof. Each caulk 3c has the same size, and is arranged at an equivalent radial position.

Also with this configuration, the front and the back of the stator core 3 can be distinguished. Accordingly, assembly accuracy of the resolver can be improved by matching directions of shear drops and burrs, with the result that angle detection errors can be reduced. Further, the stator core 3 is formed of the electromagnetic steel sheets laminated without rotary lamination. Thus, productivity and assembling ability are improved. In addition, the rotational position of the stator core 3 can be ascertained, thereby being capable of ascertaining the positions of the windings and the relative positions of the windings to the rolling direction of the stator core 3. Accordingly, the positions of the windings and the relative positions to the rolling direction of the stator core 3 can be uniformized in all of the respective resolvers. Consequently, fluctuations in angle detection errors can be reduced.

In addition, as compared to a case where the total number of the caulks 3c, the holes 3d, and the like is equal to the number of the teeth 3a, the number of the caulks 3c can be increased, thereby being capable of increasing a force of fastening the electromagnetic steel sheets to each other. Further, deformation of an inner diameter of the stator core 3 resulting from asymmetrical positions of the caulks 3c can be reduced, thereby being capable of reducing angle detection errors resulting from the deformation.

With reference to FIG. 21, description is made of the case where the marks (holes 3d) that do not serve as the joining means are used as the marks, and where the number of the marks is three and the marks are placed on two surfaces (axial upper and lower end surfaces). However, the marks (caulks 3c) that serve as the joining means may be used as the marks, and the number and arrangement of the marks, and the number of the surfaces having the marks are not limited thereto. It is only necessary that the marks be placed on the stator core 3 so as to enable distinction of the rolling direction and the front and the back of the stator core 3. In other words, it is only necessary that the following conditions be satisfied. When the stator core 3 is rotated about the rotation shaft of the resolver rotor 1 by the arbitrary angle larger than 0 degrees and smaller than 360 degrees so that the teeth 3a overlap each other, a position of at least one of the marks does not match to positions of the other marks before and after rotation. Further, when the stator core 3 in a reversed state is rotated about the rotation shaft of the resolver rotor 1 by the arbitrary angle, and then the stator core 3 in an unreversed state and the stator core 3 in the reversed and rotated state are arranged so that the teeth 3a overlap each other, a position of at least one of the marks does not match to positions of the other marks.

Sixth Embodiment

Figure 22:
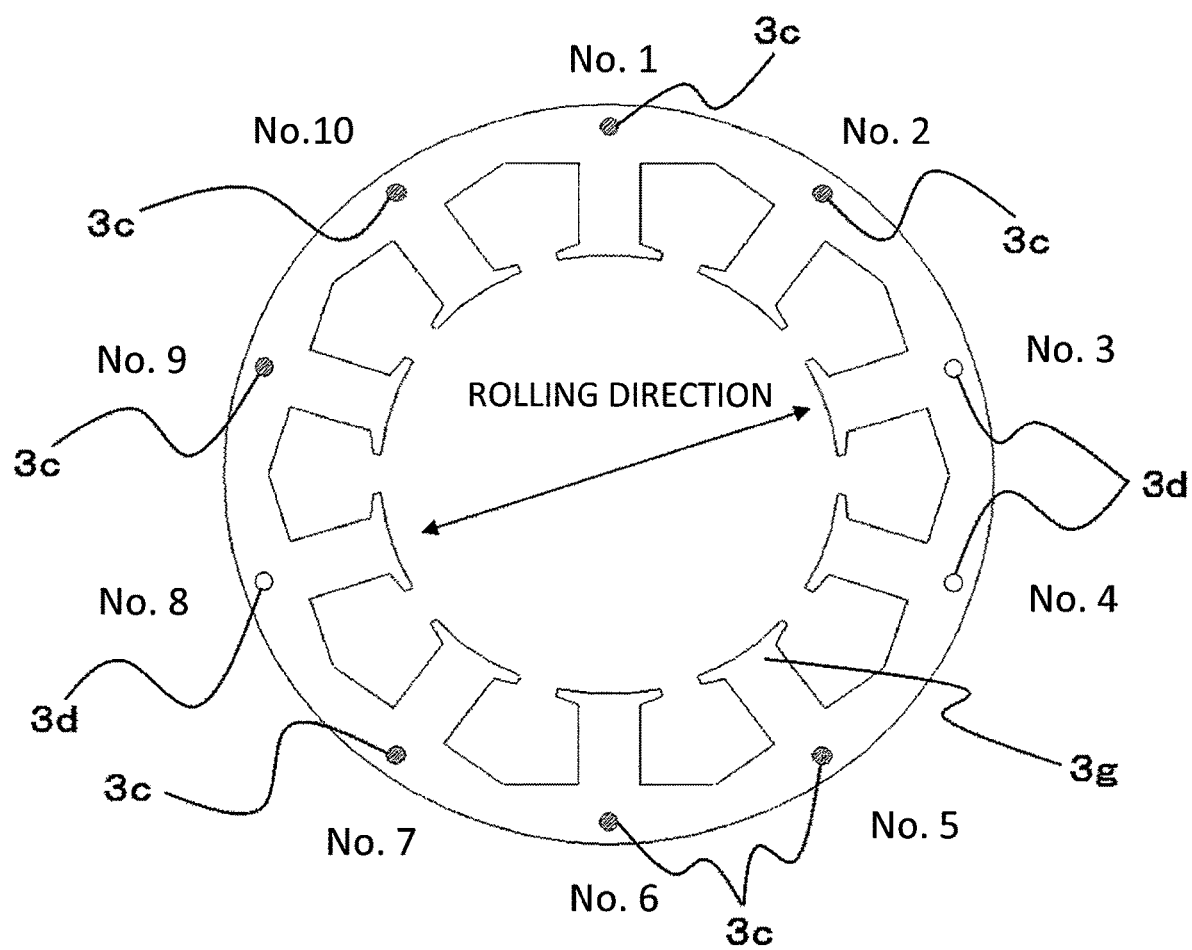
FIG. 22 is a plan view of a stator core according to a sixth embodiment of the present invention.
Figure 23:
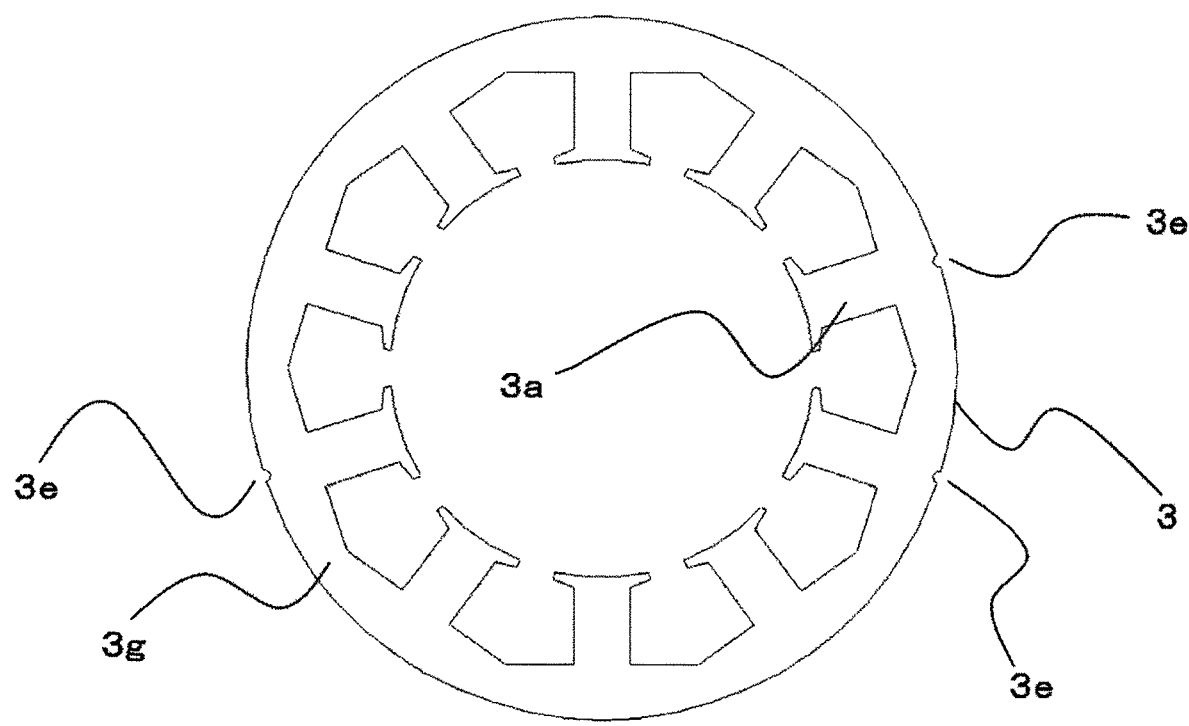
FIG. 23 is a plan view of a stator core according to a modified example of the sixth embodiment of the present invention.
Figure 24:
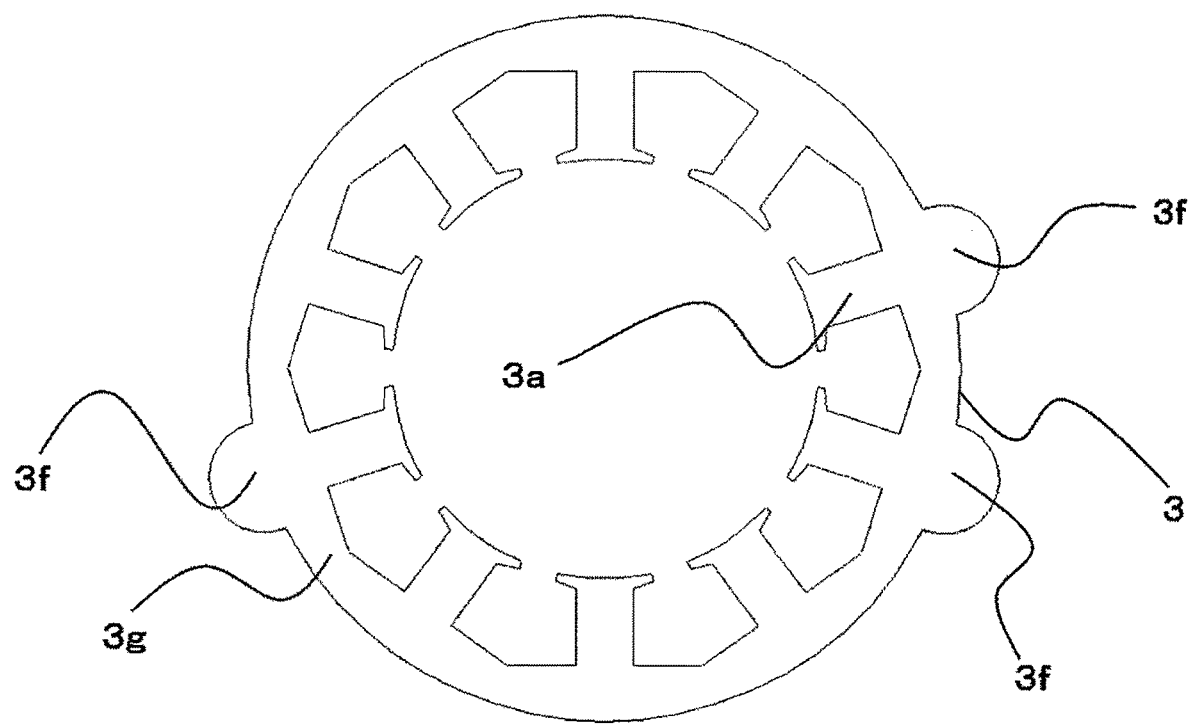
FIG. 24 is a plan view of a stator core according to another modified example of the sixth embodiment of the present invention.
Figure 25:
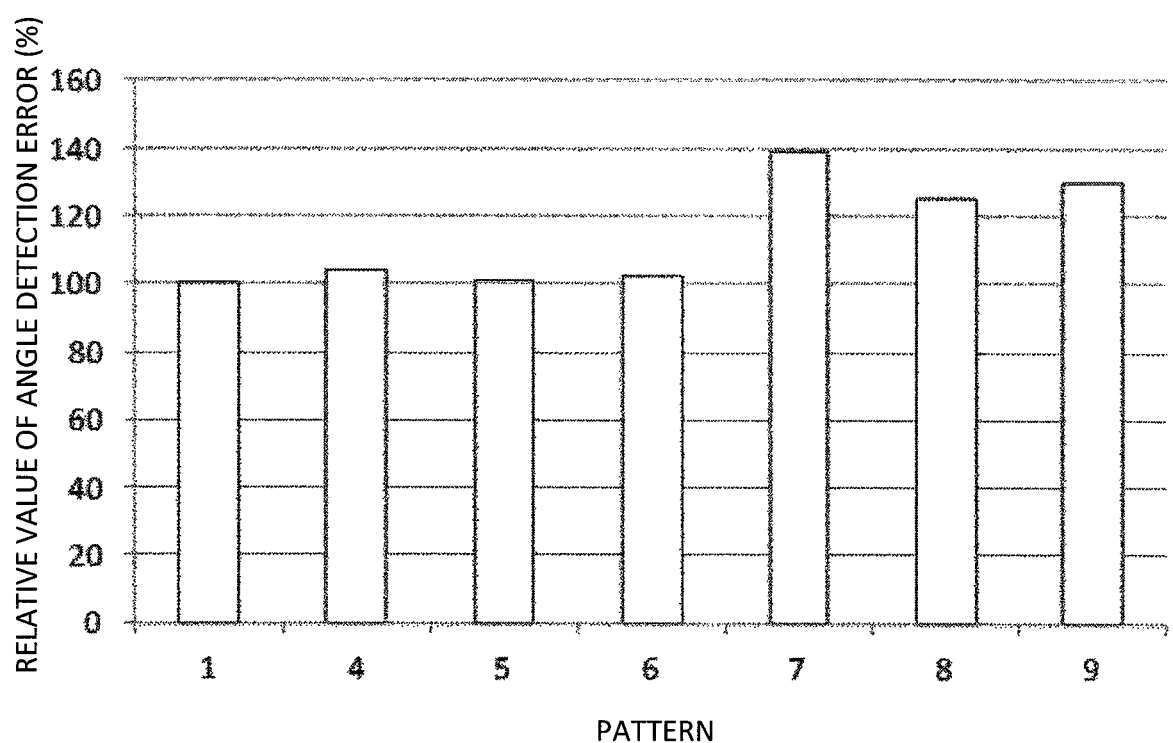
FIG. 25 is an explanatory graph for showing actual measurement results of a relationship of arrangement of holes as marks and relative positions of the marks to the rolling direction of the stator core to angle detection errors in the resolver according to the sixth embodiment of the present invention.

Now, a sixth embodiment of the present invention is described with reference to FIG. 22 to FIG. 25. FIG. 22 is a plan view of a stator core according to the sixth embodiment of the present invention. FIG. 23 and FIG. 24 are plan views of stator cores according to modified examples of the sixth embodiment of the present invention. FIG. 25 is an explanatory graph for showing actual measurement results of a relationship of arrangement of holes as the marks and relative positions of the marks to the rolling direction of the stator core to angle detection errors in a resolver according to the sixth embodiment of the present invention.

In this embodiment, description is made of a case where any one of the mark (hole 3d) that does not serve as the joining means, and the mark (caulk 3c) that serves as the joining means is used as the mark, and where the total number of the marks is equal to the number of slots.

In FIG. 22, three holes 3d and seven caulks 3c are arranged in the core back 3g of the stator core 3. The holes 3d and the caulks 3c are each on the circumferential center line of one of the teeth 3a. All of the holes 3d and the caulks 3c have the same size, and are arranged at equivalent radial positions. Any one of the holes 3d and the caulks 3c is arranged on every portion of the core back 3g from which one of the teeth 3a protrudes. The rolling direction of the stator core 3 matches to circumferential center lines of opposed teeth 3a among three teeth 3a respectively protruding from the portions of the core back 3g having the holes 3d formed therein.

Also with this configuration, the front and the back of the stator core 3 can be distinguished. Accordingly, assembly accuracy of the resolver can be improved by matching directions of shear drops and burrs, with the result that angle detection errors can be reduced. Further, the stator core 3 is formed of the electromagnetic steel sheets laminated without rotary lamination. Thus, productivity and assembling ability are improved. In addition, the rotational position of the stator core 3 can be ascertained, thereby being capable of ascertaining the positions of the windings and the relative positions of the windings to the rolling direction of the stator core 3. Accordingly, the positions of the windings and the relative positions to the rolling direction of the stator core 3 can be uniformized in all of the respective resolvers. Consequently, fluctuations in angle detection errors can be reduced.

In addition, as compared to a case where the total number of the caulks 3c, the holes 3d, and the like is larger than the number of the teeth 3a as in the case of the structure described in the fifth embodiment, the total number of the marks can be reduced. Thus, reluctance of the stator core 3 is reduced. As a result, the magnetic flux easily passes, and angle detection errors can be reduced.

Further, centers of the holes 3d and the caulks 3c are at equivalent radial positions, respectively. Thus, the magnetic path is symmetrical, with the result that angle detection errors are reduced as compared to a case where the magnetic path is asymmetrical.

Still further, the centers of the holes 3d and the caulks 3c are at equiangular positions, respectively. Thus, the magnetic path is symmetrical, with the result that angle detection errors are reduced as compared to a case where the magnetic path is asymmetrical.

In addition, the circumferential center lines of the teeth 3a and the rolling direction of the stator core 3 match to each other. Thus, the magnetic flux easily passes, with the result that angle detection errors are reduced as compared to a case where the rolling direction of the stator core 3 does not match to the circumferential center lines of the teeth 3a.

The teeth 3a having the circumferential center lines matching to the rolling direction of the stator core 3 may be set to arbitrary teeth 3a. Also in this case, the same effect as that in the above-mentioned case can be obtained.

With reference to FIG. 22, description is made of the case where the marks (holes 3d) that do not serve as the joining means are used as the marks, and where the number of the marks is three and the marks are placed on two surfaces (axial upper and lower end surfaces). However, the marks (caulks 3c) that serve as the joining means may be used as the marks, and the number and arrangement of the marks, and the number of the surfaces having the marks are not limited thereto. It is only necessary that the total number of the marks (caulks 3c) that serve as the joining means and the marks (holes 3d) that do not serve as the joining means be equal to the number of slots. Further, it is only necessary that the marks be placed on the stator core 3 so as to enable distinction of the rolling direction and the front and the back of the stator core 3. In other words, it is only necessary that the following conditions be satisfied. When the stator core 3 is rotated about the rotation shaft of the resolver rotor 1 by the arbitrary angle larger than 0 degrees and smaller than 360 degrees so that the teeth 3a overlap each other, a position of at least one of the marks does not match to positions of the other marks before and after rotation. Further, when the stator core 3 in a reversed state is rotated about the rotation shaft of the resolver rotor 1 by the arbitrary angle, and then the stator core 3 in an unreversed state and the stator core 3 in the reversed and rotated state are arranged so that the teeth 3a overlap each other, a position of at least one of the marks does not match to positions of the other marks.

Even when some of the positions of the holes 3d and the caulks 3c illustrated in FIG. 22 are replaced, the above-mentioned effect can be obtained.

FIG. 22 is an illustration of a configuration example adopting the same patterns of the number of turns shown in FIG. 7 to FIG. 9. The effect of reducing angle detection errors may vary depending on ways of arranging the holes 3d and the caulks 3c. This point is described with reference to FIG. 25. FIG. 25 is an explanatory graph for showing actual measurement results of a relationship of arrangement of holes as marks and relative positions of the marks to the rolling direction of the stator core to angle detection errors in the resolver according to the sixth embodiment of the present invention.

A configuration of Pattern 1 shown in FIG. 25 corresponds to the configuration illustrated in FIG. 22. The holes 3d are formed in portions of the core back 3g from which the teeth 3a having tooth numbers of 3, 4, and 8 protrude, and the caulks 3c are arranged on portions of the core back 3g from which the other teeth 3a protrude.

Next, description is made of Pattern 4 to Pattern 9 each having a configuration obtained by replacing some of the positions of the holes 3d and the caulks 3c in the configuration of Pattern 1. Pattern 2 and Pattern 3 are described later.

First, as a precondition, in Pattern 1 and Pattern 4 to Pattern 6, the rolling direction of the stator core 3 matches to circumferential center lines of radially opposed teeth 3a among three teeth 3a located at portions of the core back 3g having the holes 3d formed therein.

In Pattern 4, the holes 3d are formed in portions of the core back 3g from which the teeth 3a having tooth numbers of 3, 5, and 8 protrude, and the caulks 3c are arranged on portions of the core back 3g from which the other teeth 3a protrude. In Pattern 5, the holes 3d are formed in portions of the core back 3g from which the teeth 3a having tooth numbers of 3, 8, and 9 protrude, and the caulks 3c are arranged on portions of the core back 3g from which the other teeth 3a protrude. In Pattern 6, the holes 3d are formed in portions of the core back 3g from which the teeth 3a having tooth numbers of 3, 8, and 10 protrude, and the caulks 3c are arranged on portions of the core back 3g from which the other teeth 3a protrude.

Meanwhile, as a precondition, in Pattern 7 to Pattern 9, the rolling direction of the stator core 3 does not match to circumferential center lines of radially opposed teeth 3a among three teeth 3a located at portions of the core back 3g having the holes 3d formed therein. In other words, the rolling direction of the stator core 3 matches to circumferential center lines of radially opposed teeth 3a other than radially opposed teeth 3a located at portions of the core back 3g having the holes 3d formed therein as the marks.

In Pattern 7, the holes 3d are formed in portions of the core back 3g from which the teeth 3a having tooth numbers of 4, 5, and 9 protrude, and the caulks 3c are arranged on portions of the core back 3g from which the other teeth 3a protrude. In Pattern 8, the holes 3d are formed in portions of the core back 3g from which the teeth 3a having tooth numbers of 4, 9, and 10 protrude, and the caulks 3c are arranged on portions of the core back 3g from which the other teeth 3a protrude. In Pattern 9, the holes 3d are formed in portions of the core back 3g from which the teeth 3a having tooth numbers of 5, 9, and 10 protrude, and the caulks 3c are arranged on portions of the core back 3g from which the other teeth 3a protrude.

In the cases of the configurations of Pattern 1 and Pattern 4 to Pattern 6, angle detection errors can be further reduced as compared to the cases of the configurations of Pattern 7 to Pattern 9. This is because reluctance of the stator core 3 in the rolling direction is lower than reluctance thereof in another direction so that a large amount of magnetic flux flows in the rolling direction. In a case where the hole 3d is formed in a portion of the core back 3g of the stator core 3, reluctance is higher at the portion of the core back 3g than in a case where no hole 3d is formed in the core back 3g. Consequently, the magnetic flux is reduced.

In the configurations of Pattern 1 and Pattern 4 to Pattern 6, the rolling direction of the stator core 3 matches to circumferential center lines of radially opposed teeth 3a among three teeth 3a abutting on portions of the core back 3g having the holes 3d formed therein. Thus, as compared to the configurations of Pattern 7 to Pattern 9, a difference between a maximum value and a minimum value of magnetic permeability of each core back 3g is small, and the magnetic path is symmetrical. Accordingly, angle detection errors can be further reduced as compared to the configurations of Pattern 7 to Pattern 9.

Next, description is made of specific angle detection errors in the above-mentioned configurations of respective patterns. FIG. 25 is an explanatory graph for showing actual measurement results of a relationship of arrangement of holes as the marks and relative positions of the marks to the rolling direction of the stator core to angle detection errors in the resolver according to the sixth embodiment of the present invention.

Pattern 1 and Pattern 4 to Pattern 9 on the horizontal axis correspond to the case where the holes 3d and the caulks 3c are positioned as in the above-mentioned configurations of Pattern 1 and Pattern 4 to Pattern 9. A relative value of an angle detection error on the vertical axis is a value obtained by dividing an angle detection error in each pattern by an angle detection error in Pattern 1, and multiplying the resulting division by 100.

From those results, as relative values of angle detection errors in the respective patterns, a value of from 100% to 104% is shown in Pattern 1 and Pattern 4 to Pattern 6, whereas a value of from 125% to 139% is shown in Pattern 7 to Pattern 9. Also from this fact, the configurations of Pattern 1 and Pattern 4 to Pattern 6 can further reduce angle detection errors as compared to the configurations of Pattern 7 to Pattern 9.

As described above, means as the marks in all of the embodiments is not limited to the caulk 3c and the hole 3d. For example, in place of a caulk, a hole may be formed in a portion to be caulked, and the portion to be caulked may be fixed by a bolt. Further, instead of caulking, welding may be performed on an outer periphery of the stator core 3, and a notch or a protruding portion may be formed as the mark in the outer periphery of the stator core 3.

As specific examples of the above-mentioned configuration, Pattern 2 and Pattern 3 according to the sixth embodiment are described with reference to FIG. 23 and FIG. 24. FIG. 23 and FIG. 24 are plan views of stator cores according to modified examples of the sixth embodiment of the present invention.

FIG. 23 is an illustration of an example of forming notches 3e in the outer periphery of the stator core 3, and FIG. 24 is an illustration of an example of forming protruding portions 3f in the outer periphery of the stator core 3. Welding of the stator core 3 may be performed on a circular arc portion of the outer periphery of the stator core 3, or may be performed after the notches 3e are formed in the outer periphery of the stator core 3. Even with those configurations, the same effect as that in the above-mentioned configurations can be obtained.

In a case where welding is performed on the circular arc portion of the outer periphery of the stator core 3, and the protruding portions 3f are formed on the outer periphery of the stator core 3, magnetic permeability of the stator core 3 is increased as compared to a case where the hole 3d or the caulk 3c is formed in the stator core 3. Consequently, angle detection errors can be reduced.

Meanwhile, in a case where the notches 3e or the holes 3d rather than the protruding portions 3f are formed in the outer periphery of the stator core 3 so as to be used as the marks, a yield of a material for the electromagnetic steel sheets can be increased as compared to a case where the protruding portions 3f are formed in the outer periphery of the stator core 3.

Further, the case where the mark is visually determined (determination includes image processing when the determination is performed automatically) is described above. A configuration capable of achieving further reliable determination (reduction of erroneous determination) is described below.

When the holes 3d are formed in the stator core 3 as in the above-mentioned configuration illustrated in FIG. 22, pins (not shown) integrated with the insulating members 4 and 5 are arranged so as to overlap positions of the holes 3d of the stator core 3. In this manner, when the insulating members 4 and 5 are mounted to the stator core 3, erroneous determination of the rotational position and the front and the back of the stator core 3 can be prevented. When the erroneous determination is made, the pins are not inserted into the holes 3d, and hit against the stator core 3. Consequently, mounting fails when the insulating members 4 and 5 are mounted to the stator core 3 from both sides in the axial direction. Thus, the erroneous determination can be noticed.

When the pins are used, not limited to the holes 3d, the notches 3e or the like may be formed so as to overlap positions of the pins.

Further, the case where the hole 3d and the caulk 3c have the same size is described above, and an effect obtained with this configuration is described. The center of the hole 3d and the center of the caulk 3c are each on the circumferential center line of one of the teeth 3a, and any one of the hole 3d and the caulk 3c is arranged in each of the teeth 3a. The caulk 3c and the hole 3d have the same size, and are arranged at equivalent radial positions.

In this arrangement, the magnetic path is symmetrical as compared to a case where any one of the caulk 3c and the hole 3d is not arranged in each of the teeth 3a, that is, a case where each of the teeth 3a does not have rotational symmetry. Consequently, angle detection errors are reduced.

Further, the hole 3d and the caulk 3c may have different sizes. In a case where reluctance of the hole 3d and reluctance of the caulk 3c are further equalized by adjusting the sizes of the hole 3d and the caulk 3c, the magnetic path is symmetrical as compared to the case where the hole 3d and the caulk 3c have the same size as described above. Consequently, angle detection errors are reduced.

In the second and third embodiments described above, description is made of the case where only one caulk 3c is used to join the stator core 3. When fixation is reliably carried out, in general, two or more caulks 3c are used. However, even in the case where only one caulk 3c is used, the stator core 3 is covered with the insulating members 4 and 5 so that joining of the stator core 3 can be reliably carried out.

Further, when the rolling direction of the stator core 3 matches to circumferential center lines of arbitrary teeth 3a not only in the configuration according to the sixth embodiment but also in the configuration according to another embodiment, the magnetic flux easily passes because the circumferential center lines of the teeth 3a and the rolling direction of the stator core 3 match to each other. Consequently, angle detection errors can be reduced as compared to a case where the circumferential center lines of the teeth 3a and the rolling direction of the stator core 3 do not match to each other.

In addition, when the rolling direction of the stator core 3 matches to the circumferential center lines of the arbitrary teeth 3a, as shown in FIG. 11, such arrangement as to reduce angle detection errors is adopted in consideration of the rolling direction of the stator core 3 and the relative positions of the windings. Thus, angle detection errors can be further reduced.

Further, the resolver of an inner rotor type is described above in all of the embodiments, but the same effect can be also obtained in a resolver of an outer rotor type. This is because radial orientations are merely exchanged in view of magnetism. At this time, in the inner rotor type, a notch or a portion to be welded is formed in the outer periphery of the stator core. In contrast, in an outer rotor type, a notch or a portion to be welded is formed in an inner periphery of a stator core. This is for the purpose of avoiding a change of surfaces of the resolver rotor and the resolver stator opposed to each other through the gap. The change of the surfaces opposed to each other through the gap causes an increase in angle detection errors.

REFERENCE SIGNS LIST

1: resolver rotor, 2: resolver stator, 3: stator core, 3a: teeth, 3b: printed mark (mark), 3c: caulk (mark), 3d: hole (mark), 3e: notch (mark), 3f: protruding portion (mark), 3g: core back

The invention claimed is:

1. A resolver, comprising:
a resolver stator comprising:
a stator core formed of electromagnetic steel sheets, which have teeth and are laminated without rotary lamination;
a one-phase excitation winding; and
two-phase output windings; and
a resolver rotor arranged to be opposed to the resolver stator,
wherein the stator core has marks which enable distinction of a rolling direction of the stator core and distinction of a front and a back of the stator core,
wherein the number of the marks is equal to the number of the teeth,
wherein one of the marks serves as joining means and another of the marks is a hole which does not serve as the joining means,
wherein the hole is placed on a core back of the stator core, and
wherein the rolling direction of the stator core matches to circumferential center lines of radially opposed teeth abutting on portions of the core back having the hole placed thereon.

2. The resolver according to claim 1,
wherein, when the stator core is rotated about a rotation shaft of the resolver rotor by an arbitrary angle larger than 0 degrees and smaller than 360 degrees so that the teeth overlap each other, a position of at least one of the marks does not match to positions of the other marks before and after rotation, and
wherein, when the stator core in a reversed state is rotated about the rotation shaft of the resolver rotor by the arbitrary angle, and then the stator core in an unreversed state and the stator core in the reversed and rotated state are arranged so that the teeth overlap each other, a position of at least one of the marks does not match to positions of the other marks.

3. The resolver according to claim 1, wherein the marks are placed on any one of an axial end surface of the stator core, and a peripheral surface of the stator core opposite to surfaces of the resolver rotor which is opposed to the resolver stator through a gap.

4. The resolver according to claim 1, wherein the marks are arranged equiangularly.

5. The resolver according to claim 1, wherein centers of the marks are at equivalent radial positions, respectively.

6. The resolver according to claim 1, wherein centers of the marks are each positioned on a circumferential center line of one of the teeth.

7. The resolver according to claim 1, wherein centers of the marks are each positioned at a middle portion between circumferential centers of adjacent teeth.

8. The resolver according to claim 1, wherein the mark that serves as the joining means and the mark that does not serve as the joining means have the same size.

9. The resolver according to claim 1, wherein circumferential center lines of arbitrary teeth and the rolling direction of the stator core match to each other.

10. The resolver according to claim 9, wherein the arbitrary teeth comprise predetermined teeth satisfying that an absolute value of the number of turns is maximum or minimum in any one of the two phases of the output windings.

11. The resolver according to claim 9,
wherein the mark that does not serve as the joining means is placed on a portion of the core back located at every one of the arbitrary teeth, and
wherein the mark that serves as the joining means is placed on at least one portion of the core back located at a tooth other than the arbitrary teeth, or neither the mark that serves as the joining means nor the mark that does not serve as the joining means is placed on a portion of the core back located at a tooth other than the arbitrary teeth.

12. The resolver according to claim 9,
wherein neither the mark that serves as the joining means nor the mark that does not serve as the joining means is placed on at least one portion of the core back abutting on a tooth other than the arbitrary teeth.

* * * * *